United States Patent [19]

Ikegaya et al.

[11] Patent Number: 5,340,196
[45] Date of Patent: Aug. 23, 1994

[54] SEAT RECLINING APPARATUS

[75] Inventors: Isao Ikegaya; Mituji Yamamura, both of Washizu, Japan

[73] Assignee: Fujikiko Kabushiki Kaisha, Tokyo, Japan

[21] Appl. No.: 859,506

[22] PCT Filed: Oct. 29, 1991

[86] PCT No.: PCT/JP91/01475
§ 371 Date: Aug. 3, 1992
§ 102(e) Date: Aug. 3, 1992

[87] PCT Pub. No.: WO92/07491
PCT Pub. Date: May 14, 1992

[30] Foreign Application Priority Data

Oct. 31, 1990 [JP] Japan .................. 2-113433[U]
Mar. 29, 1991 [JP] Japan .................. 3-20125[U]
Oct. 31, 1991 [JP] Japan .................. 3-113431[U]
Oct. 31, 1991 [JP] Japan .................. 3-113432[U]
Oct. 31, 1991 [JP] Japan .................. 3-292182

[51] Int. Cl.$^5$ .............................. B60N 2/20
[52] U.S. Cl. ................. 297/367; 297/354.12
[58] Field of Search ........... 297/367, 366, 354, 355, 297/354.1, 354.12

[56] References Cited

U.S. PATENT DOCUMENTS

| | | | |
|---|---|---|---|
| 4,384,744 | 5/1983 | Barley | 297/367 |
| 4,394,048 | 7/1983 | Sakurai et al. | 297/367 |
| 4,541,672 | 9/1985 | Fukuta et al. | 297/367 |
| 4,874,205 | 10/1989 | Arefinejad et al. | 297/367 X |

FOREIGN PATENT DOCUMENTS

| | | |
|---|---|---|
| 44-27222 | 11/1969 | Japan . |
| 56-168957 | 12/1981 | Japan . |
| 62-26008 | 2/1987 | Japan . |
| 63-138161 | 9/1988 | Japan . |
| 64-49141 | 3/1989 | Japan . |

Primary Examiner—Kenneth J. Dorner
Assistant Examiner—Milton Nelson, Jr.
Attorney, Agent, or Firm—Hopkins & Thomas

[57] ABSTRACT

A seat reclining apparatus comprises a pair of base plates (10A, 10B) on the outer side and on the inner side fixedly mounted respectively on both right- and left-hand sides of a seat cushion, and a pair of arms (90) fixedly mounted respectively on both left- and right-hand sides of a seat back, and mounted respectively on the base plates. The seat reclining apparatus further comprises a pair of locking mechanisms which have a pair of upper teeth (20) mounted respectively on the arms, a pair of lower teeth (30) engageable with and disengageable from the upper teeth, respectively, and a pair of cam members (50) for operating the lower teeth, respectively. The arrangement is such that the cam members are operated by operation of an operating lever (40) which is mounted on one of the base plates. In a preferred embodiment, at least one of the pair of upper teeth is so set as to be movable angularly through a predetermined angle with respect to a corresponding one of the arms. Further, a synchronizing mechanism is provided for synchronizing operation of the left-hand cam member and operation of the right-hand cam member with each other. The base plates are reinforced respectively by a pair of reinforcing members (80).

13 Claims, 21 Drawing Sheets

FIG. 5
FIG. 6
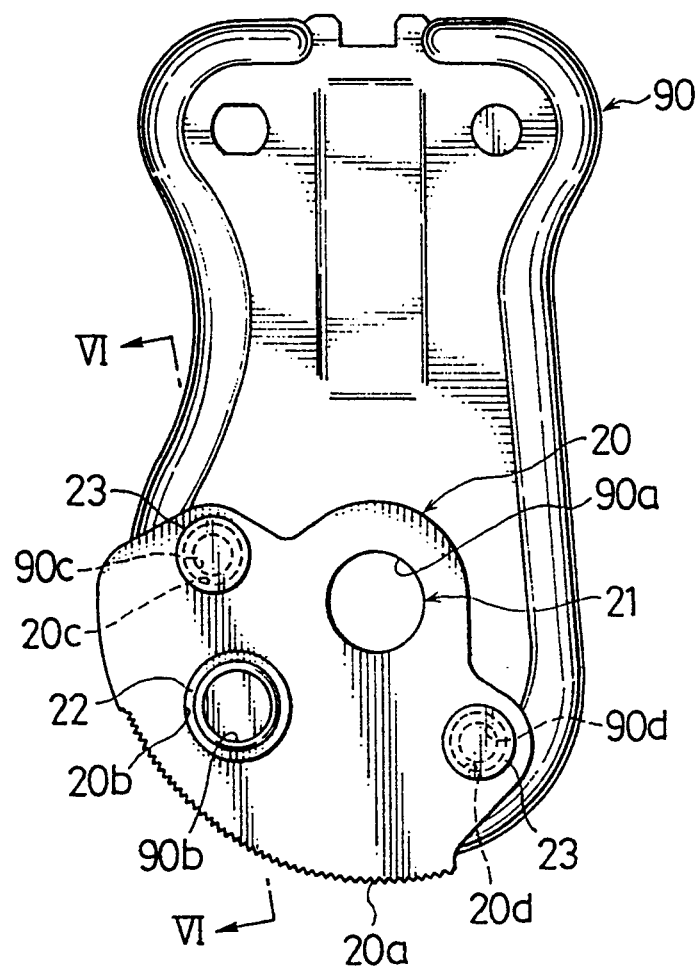
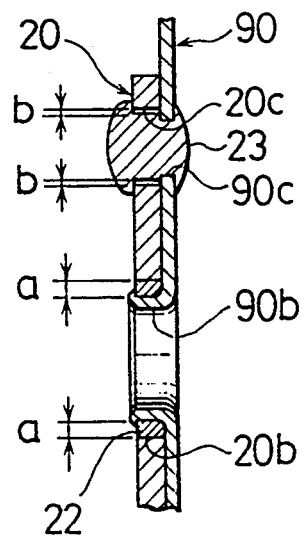

SEAT RECLINING APPARATUS

TECHNICAL FIELD

This invention relates to seat reclining apparatuses for vehicles and, more particularly, to a seat reclining apparatus of both-side locking type in which a pair of seat reclining units of latch type are arranged respectively on both right- and left-hand sides of a seat.

BACKGROUND ART

A seat reclining apparatus of this kind comprises a pair of base plates on the outer side and on the inner side fixedly mounted respectively on the left- and right-sides of a seat cushion, and a pair of arms fixedly mounted respectively on both left- and right-hand sides of a seat back and mounted respectively on the base plates. The seat reclining apparatus further comprises a pair of locking mechanisms which comprise a pair of upper teeth mounted respectively on the arms, a pair of lower teeth engageable with and disengageable from the upper teeth, respectively, and a pair of cam members for operating the lower teeth, respectively. The arrangement is such that the cam members operate by operation of an operating lever which is mounted on one of the base plates.

The arrangement is such that, by operation of the operating lever which is arranged on the base plate on, for example, the outer side, the locking mechanism of the seat reclining unit on the inner side follows in interlocking relation to the locking mechanism of the seat reclining unit on the outer side, so that locking and unlocking of the lower teeth with respect respective to the upper teeth are executed. As this interlocking arrangement, an actuating lever on the outer side, which is arranged at a rear portion of the base plate on the outer side and which is interlocked with the operating lever, and an actuating lever on the inner side, which is arranged at a rear portion of the base plate on the inner side, are connected to each other by a wire which is so arranged as to wind a front section of the seat.

However, in the above-described conventional seat reclining apparatus, there is a case where shift in phase at locking occurs between the seat reclining units on the outer side and on the inner side, due to distortion of a seat frame, distortion of a floor of a vehicle body, and the like, whereby, even if, for example, the seat reclining unit on the outer side is locked, the seat reclining unit on the inner side is brought to imperfect or incomplete locking, that is, so-called half locking. In order to prevent breakage of the upper tooth, the lower tooth and the like due to this half locking, the conventional seat reclining apparatus is arranged such that thickness of each of the upper tooth, the lower tooth and the like increases to raise strength thereof. For this reason, there is a problem that weight increases and a cost is raised.

Further, by variation in dimension of various parts of the seat reclining units on the outer side and on the inner side, and the like, there is a case where shift in phase occurs between the seat reclining units on the outer side and on the inner side at unlocking so that unlocking of the seat reclining unit on the outer side and unlocking of the seat reclining unit on the inner side are not synchronized with each other. For this reason, there is a fear that operating feeling of the operating lever is reduced.

Furthermore, the wire is arranged so as to extend from the rear portion of the base plate on the outer side to the rear portion of the base plate on the inner side through the front portion of the seat. In such wire arranging method, the wire is inevitably lengthened. For this reason, there is a problem that pulling or tension efficiency of the wire is reduced so that operability of the operating lever is deteriorated, and a cost increases.

Moreover, recently, reduction in weight of the vehicle has strongly been desired and, in keeping therewith, plate members such as the base plates and the like use plates thin as far as possible. Since, however, a considerably large load from the seat back through the arms is applied to various pivots of the seat reclining apparatus, i.e., pivots for the upper teeth, it is required to fixedly mount these pivots firmly on the base plates. For this reason, it was impossible to reduce the thickness of each of the base plates to a value equal or smaller than a predetermined thickness.

Further, since the pivots for the upper seats are important for supporting the seat cushion, the pivots are fixedly mounted by welding because the base plate is thin in thickness, or are caulked to pivot mounting portions in which washers are welded to the pivots to increase the thickness thereof. Since welding operation is executed in this manner, a welding step is required in addition to an assembling step. For this reason, there was a problem that automatization of the assembling is made impossible, and a manufacturing cost increases.

This invention has been done in order to solve the above-discussed problems of the prior art, and an object of the invention is to provide a seat reclining apparatus capable of correcting shift in phase at locking and unlocking of a pair of seat reclining units which are arranged respectively on both left- and right-sides of a seat.

Mother object of this invention is to provide a seat reclining apparatus in which, in an interlocking arrangement of a pair of seat reclining units on the outer side and on the inner side, a wire can be shortened as far as possible.

Still another object of this invention is to provide a seat reclining apparatus capable off reducing thickness of each of a pair of base plates as far as possible, and capable of eliminating a welding step.

DISCLOSURE OF THE INVENTION

In order to achieve the above purposes, according to the invention, from a first viewpoint, there is provided a seat reclining apparatus for adjusting an inclined angle of a seat back with respect to a seat cushion, comprising:

- a pair of base plates fixedly mounted respectively on both right- and left-hand sides of the seat cushion;
- a pair of arms fixedly mounted respectively on both left- and right-hand sides of the seat back, and supported respectively by the base plates so as to be movable angularly thereto;
- a pair of upper teeth supported respectively by the arms, at least one of the pair of upper teeth being so set as to be movable angularly only through a predetermined angle with respect to a corresponding one of the arms;
- a pair of lower teeth supported respectively by the base plates so as to be movable angularly thereto, and engageable with and disengageable from the upper teeth, respectively;
- a pair of cam members supported respectively by the base plates so as to be movable angularly thereto, and for operating respectively the lower teeth to engage and disengage the lower teeth with and from the upper teeth, respectively; and an operating lever for operating the pair of cam members.

According to the invention, it is possible to displace the upper teeth with respect respectively to the arms at locking of the seat reclining units. By doing so, it is possible to correct shift in phase at locking of the seat reclining units so that half locking can be eliminated.

Further, from a second viewpoint, according to the invention, there is provided a seat reclining apparatus for adjusting an inclined angle of a seat back with respect to a seat cushion, comprising:

a pair of base plates fixedly mounted respectively on both right- and left-hand sides of the seat cushion;

a pair of arms fixedly mounted respectively on both left- and right-hand sides of the seat back, and supported respectively by the base plates so as to be movable angularly thereto;

a pair of upper teeth supported respectively by the arms;

a pair of lower teeth supported respectively by the base plates so as to be movable angularly thereto, and engageable with and disengageable from the upper teeth, respectively;

a pair of cam members supported-respectively by the base plates so as to be movable angularly thereto, and for operating the lower teeth to engage and disengage the lower tooth with and from the upper teeth, respectively;

a connecting member for interlocking operation of the left-hand cam member and operation of the right-hand cam member with each other;

a synchronizing structure for synchronizing operation of the left-hand cam member and operation of the right-hand cam member with each other; and an operating lever for operating the pair of cam members.

According to the invention, it is possible to correct shift in phase at unlocking of the seat reclining units to synchronize unlocking of the seat reclining unit and unlocking of the seat reclining unit with each other. By doing so, it is possible to improve operation feeling of the operating lever.

Moreover, from the third viewpoint, according to the invention, there is provided a seat reclining apparatus for adjusting an inclined angle of a seat back with respect to a seat cushion, comprising:

a pair of base plates fixedly mounted respectively on both right- and left-hand sides of the seat cushion, and having guide bores, respectively;

a pair of arms fixedly mounted respectively on both left- and right-hand sides of the seat back, and supported respectively by the base plates so as to be movable angularly thereto;

a pair of upper teeth supported respectively by the arms;

a pair of lower teeth supported respectively by the base plates so as to be movable angularly thereto, and engageable with and disengageable from the upper teeth, respectively;

a pair of cam members supported respectively by the base plates so as to be movable angularly thereto, and for operating the lower teeth to engage and disengage the lower teeth with and from the upper teeth, respectively;

a connecting member for interlocking operation of the left-hand cam member and operation of the right-hand cam member with each other, and extending through the guide bores; and an operating lever for operating the pair of cam members.

According to the invention, it is possible to shorten the wire, as far as possible, for connecting the seat reclining units to each other. By doing so, it is possible to improve the tension efficiency of the wire to make operability of the operating lever superior, and an attempt can be made to reduce a cost.

Further, from the fourth viewpoint, according to the invention, there is provided a seat reclining apparatus for adjusting an inclined ankle of a seat back with respect to a seat cushion, comprising:

a base plate fixedly mounted on the seat cushion;

an arm fixedly mounted on the seat back, and supported by the base plate so as to be movable angularly thereto;

an upper tooth supported by the arm;

a lower tooth supported by the base plate so as to be movable angularly thereto, and engageable with and disengageable from the upper tooth;

a cam member supported by the base plate so as to be movable angularly thereto, and for operating the lower tooth to engage and disengage the lower tooth with and from the upper tooth;

a reinforcing member for reinforcing portions of the base plates supporting the arm, the lower tooth and the cam member; and an operating lever for operating the cam member.

According to the invention, since the strength of each of the upper tooth and the lower tooth as well as mounting portions of an actuating member is reinforced by the reinforcing plate, it is possible to reduce the thickness of the base plate as far as possible. Thus, since the thickness of each of the mounting portions increases, and the surface pressure of each of the mounting portions with respect to the pivots increases, it Is possible to mount various pivots by a caulking step.

BRIEF DESCRIPTION OF THE DRAWINGS

FIG. 5 is a view for explanation showing a relationship between an arm and an upper tooth in the first embodiment;

FIG. 6 is a cross-sectional view for explanation taken along a line VI—VI in FIG. 5;

BEST MODE FOR CARRYING OUT THE INVENTION

Figure 1:
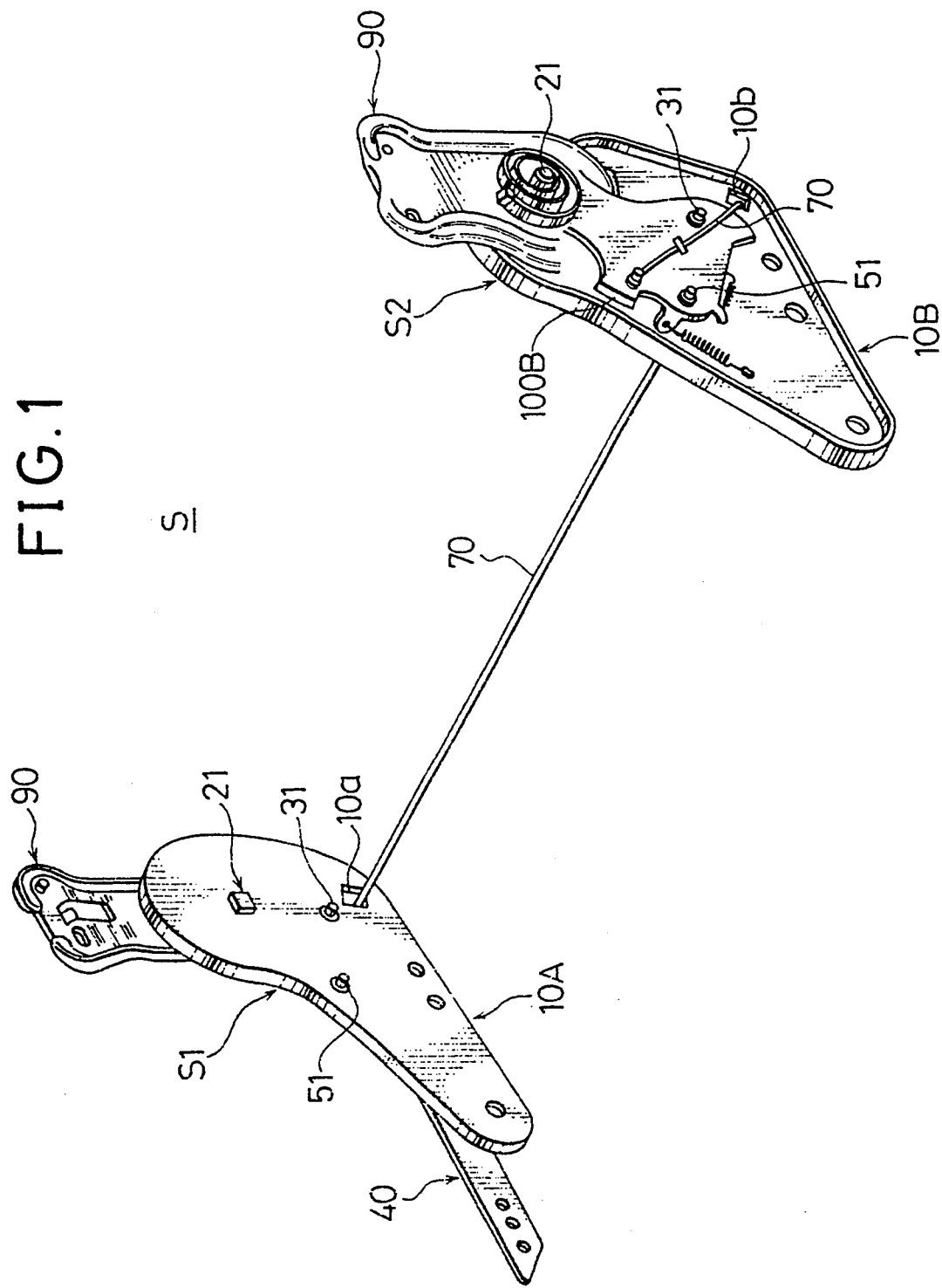
FIG. 1 is a schematic perspective view for explanation of a seat reclining apparatus according to a first embodiment of this invention.

A seat reclining apparatus according to a first embodiment of the invention-will be described with reference to the accompanying drawings.

In FIGS. 1 to 12, the reference character S denotes a seat reclining apparatus for a vehicle. A pair of arms 90 are mounted respectively on a pair of base plates 10A and 10B which are mounted respectively on both left- and right-hand sides of a seat. Between the base plates 10A and 10B and the arms 90, a pair of locking mechanisms are provided, respectively, each of which comprises an upper tooth 20, a lower tooth 30 engageable with and disengageable from the upper tooth 20, and an actuating member for actuating the lower tooth 30. On the other hand, by operation of an operating lever 40 which is mounted on the base plate 10A on, for example, the outer side, the actuating member operates so that locking and unlocking or locking release of the lower tooth 30 with respect to the upper tooth 20 can be done or executed.

A seat reclining unit S1 on the outer side will first be described with reference to FIGS. 2 to 8 and FIG. 11.

The base plate 10A on the outer side is fixedly mounted on a side portion of a seat cushion (not shown) on the outer side. The base plate 10A has an outer surface of a center portion of which a reinforcing plate 80 is disposed in overlapping relation to the base plate 10A. A first pivot 21 is mounted on the base plate 10A and the reinforcing plate 80. The first pivot 21 has a lower edge thereof on which the upper tooth 20 formed with arcuate teeth 20a is mounted. The arm 90 fixedly mounted on the side portion of the seat back (not shown) on the outer side is arranged in overlapping relation to the upper tooth 20. The upper tooth 20 has a lower portion which is formed therein with an inserting bore 90a. The inserting bore 90a is fitted about the first pivot 21. Further, the arm 90 is formed with a pair of mounting bores 90c and 90d at a location in the vicinity of the inserting bore 90a on both sides of a flange 90b formed by burring processing with the flange 90b located between the pair of mounting bores 90c and 90d. The flange 90b is inserted into the through bore 20b formed in the upper tooth 20, with a predetermined gap a. A damper 22 formed of a rubber-like resilient or elastic material or the like is interposed at the gap a. Further, on the mounting bores 90c and 90d, a pair flanged mounting pins 23 are fixedly mounted for mounting the upper tooth 20 on the arm 90. The mounting pins 23 are inserted respectively into a pair of through bores 20c and 20d formed in the upper tooth 20, with a predetermined gap b. By doing so, the upper tooth 20 is so set as to be angularly moved substantially through ½ teeth with respect to the arm 90. Furthermore, the upper tooth 20 can be retained at a neutral position by the damper 22.

The lower tooth 30 has teeth 30a which are in mesh with teeth 20a on the upper teeth 20. The lower tooth 30 is mounted on a second pivot 31 which Is mounted on the base plate 10A and the reinforcing plate 80. Moreover, the lower tooth 30 is formed with a pair of projections 30c and 30d at a lower edge of the lower tooth 30 opposite to the teeth 30a, with a recess 30b located between the pair of projections 30c and 30d. A cam member 50 engaged with or disengaged from the recess 30b and the projections 30c and 30d is mounted on a third pivot 51 which is mounted on the base plate 10A and the reinforcing plate 80. Further, the cam member 50 is biased by a tension spring 52 in a direction indicated by an arrow A in FIGS. 2 and 11, and a connecting pin 53 is mounted on the side of a free end of the cam member 50. An actuating lever 60A on the outer side is mounted on the third pivot 51. The connecting pin 53 mounted on the cam member 50 is inserted into the arcuate slot 60a whose center resides in a center of the third pivot 51 formed on the side of one free end of the actuating lever 60A. Furthermore, the actuating lever 60A is biased in the direction indicated by the arrow A in FIGS. 2 and 11 by a tension spring 43 to be described subsequently. A connecting pin 61A is mounted on the side of the one free end, of the actuating lever 60A.

A holder plate 110A on the outer side is fixedly mounted on the first, second and third pivots 21, 31 and 51 with the upper tooth 20, the lower tooth 30 and the actuating lever 60A located between portions of the holder plate 110A. Formed in the holder plate 110A is an arcuate slot 110a whose center resides in a center of the third pivot 51, into which a connecting pin 61A of the actuating lever 60A is inserted. Furthermore, a spiral spring 91 is wound about the first pivot 21 which projects from the holder plate 110A. The spiral spring 91 has one end thereof which is engaged with the first pivot 21, and the other end which is engaged with a mounting pin 92 which is mounted on the arm 90. The arm 90 is biased in a direction indicated by an arrow C in FIG. 2 by the spiral spring 91.

Figure 4:
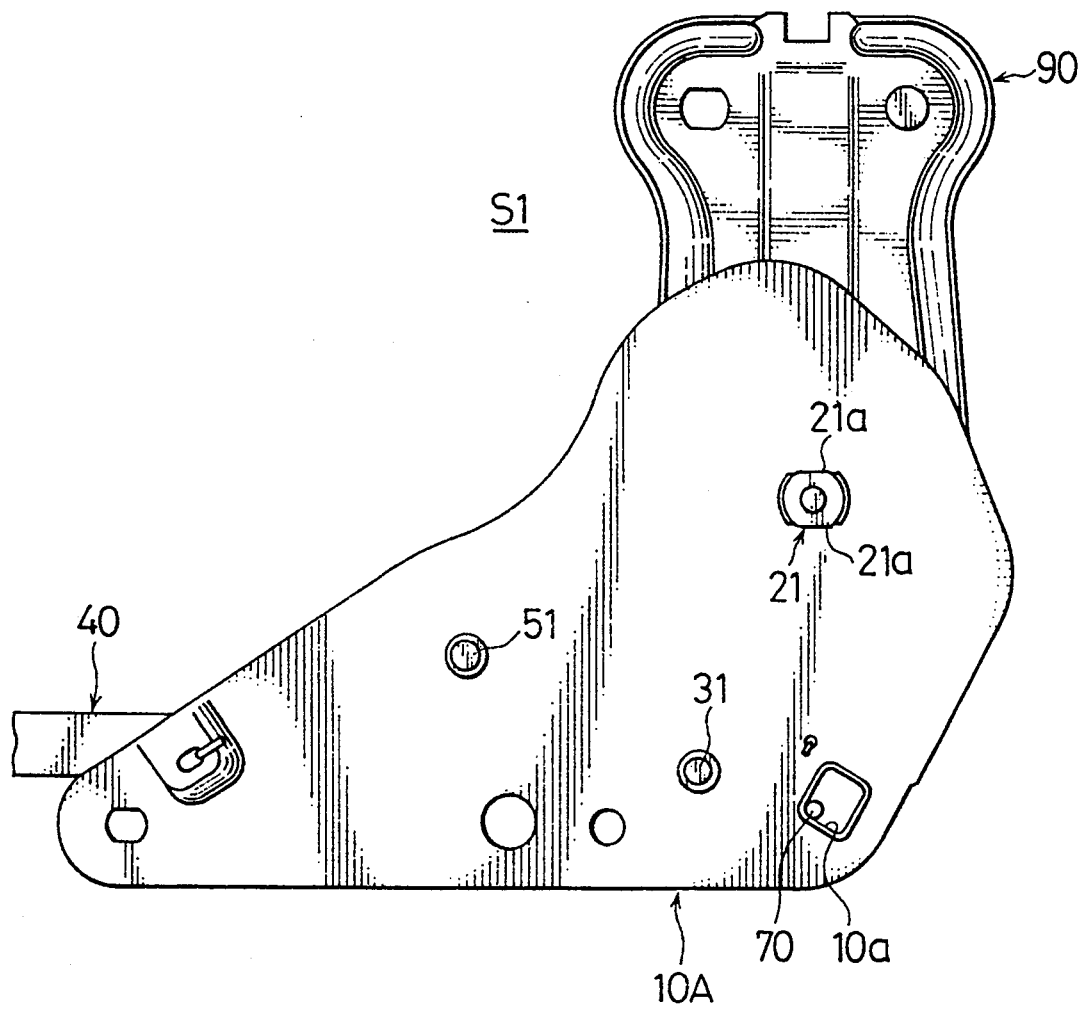
FIG. 4 is a side elevational view for explanation as viewed from an arrow IV in FIG. 3.
Figure 7:
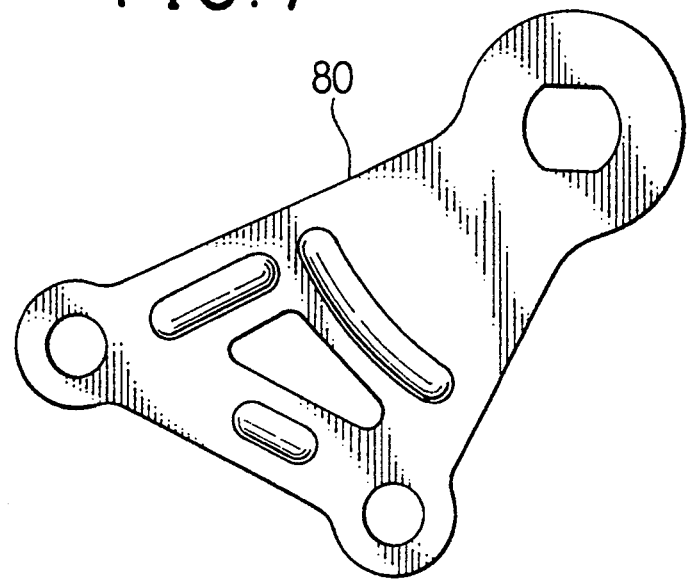
FIG. 7 is a top plan view for explanation of a reinforcing plate in the first embodiment.
Figure 8:
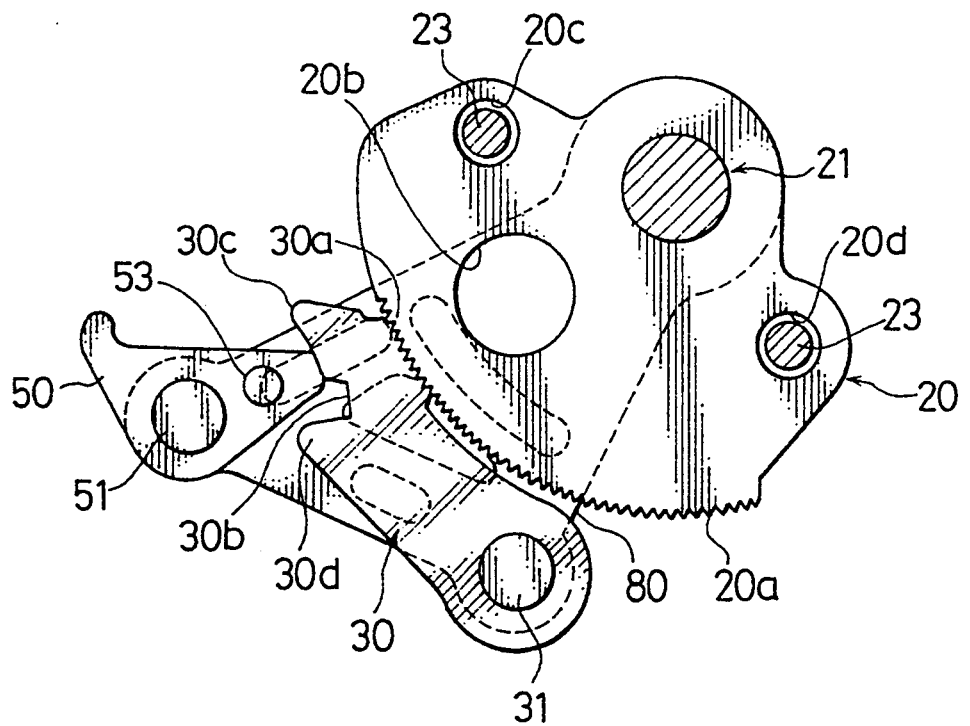
FIG. 8 is a view for explanation showing a condition under which an upper tooth, a lower tooth and a cam member are mounted on the reinforcing member illustrated in FIG. 7.

In connection with the above, the first, second and third pivots 21, 31 and 51 are provided respectively with steps. The first, second and third pivots 21, 31 and 51 are fixedly mounted in such a manner that they are inserted respectively into bores which are formed in opposed relation to the reinforcing plate 80 and the base plate 10A and, subsequently, a portion extending from the base plate 110A is caulked. Furthermore, a portion of the first pivot 21 which is inserted into the reinforcing plate 80 and the base plate 10A is formed with a pair of cut sections 21a which are in opposed relation to each other as shown in FIG. 4. By doing so, setting is made such that the first pivot 21 is fixedly mounted firmly or stably on the reinforcing plate 80 and the base plate 10A.

Figure 2:
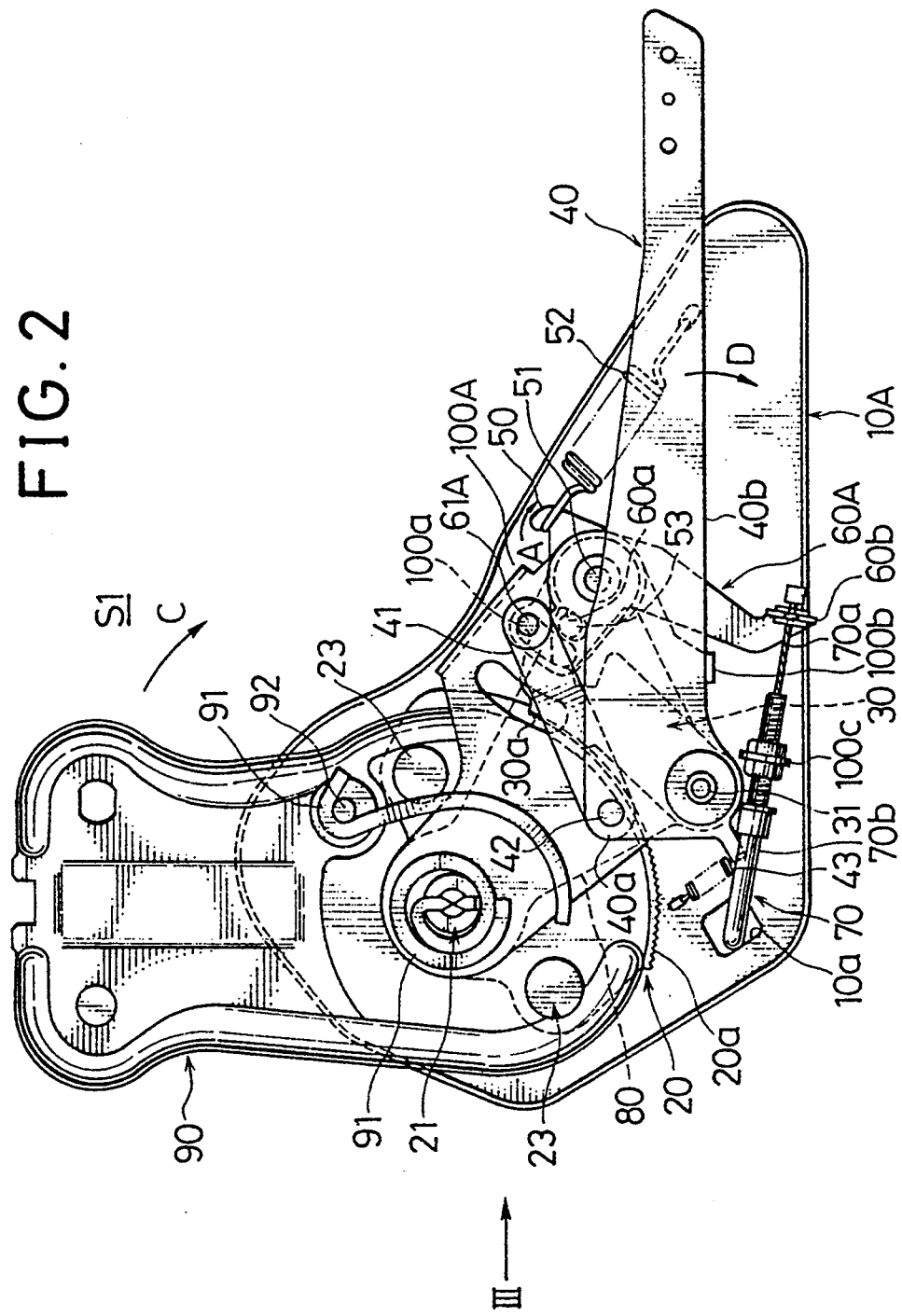
FIG. 2 is a front elevational view for explanation of a seat reclining unit on an outer side in the first embodiment.
Figure 3:
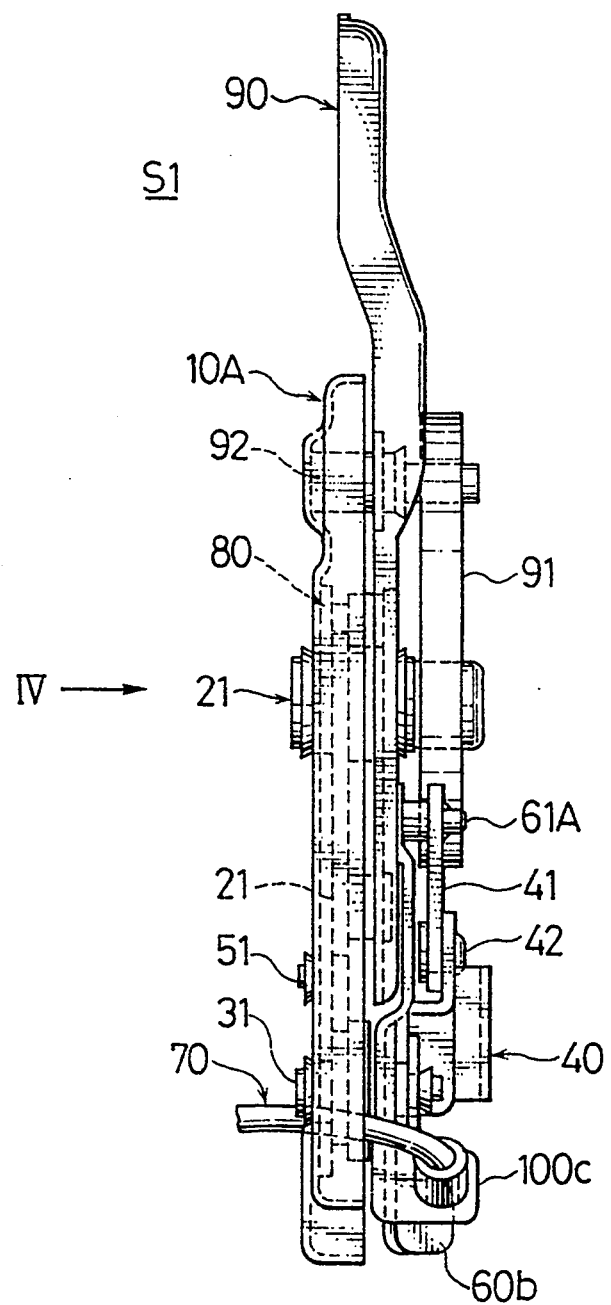
FIG.3 is a side elevational view for explanation as viewed from an arrow III in FIG. 2.

The operating lever 40 for operating, the cam member 50 through the actuating lever 60A is mounted on the second pivot 31. As shown in FIG. 2, a connecting link 41 has one end thereof which is connected to and pivoted to an upper extension 40a through a pin 42. The other end of the connecting link 41 is connected to and pivoted to the connecting pin 61A of the actuating lever 60A. Moreover, the operating lever 40 is so biased as to be moved angularly by a tension spring 43 in a direction indicated by an arrow D in FIG. 2. The angular movement is restricted by abutment of a side extension 40b against a stopper 100b which is formed by cutting and raising of the holder plate 100A. By doing so, the operating lever 40 is retained or maintained always to a predetermined position at locking.

A wire 70 for connecting the seat reclining unit S1 on the outer side and the seat reclining unit S2 on the inner side to each other is inserted into a guide opening 10a formed in the base plate 10A by burring processing in the following manner. That is, an inner wire 70a inserted into an outer case 70b has one end thereof which is engaged with a folded or bent section 60b formed on the side of the other free end of the actuating lever 60A. The outer case 70b has one end thereof which is fixedly mounted on a guide section 100c formed on the holder plate 100A.

Figure 9:
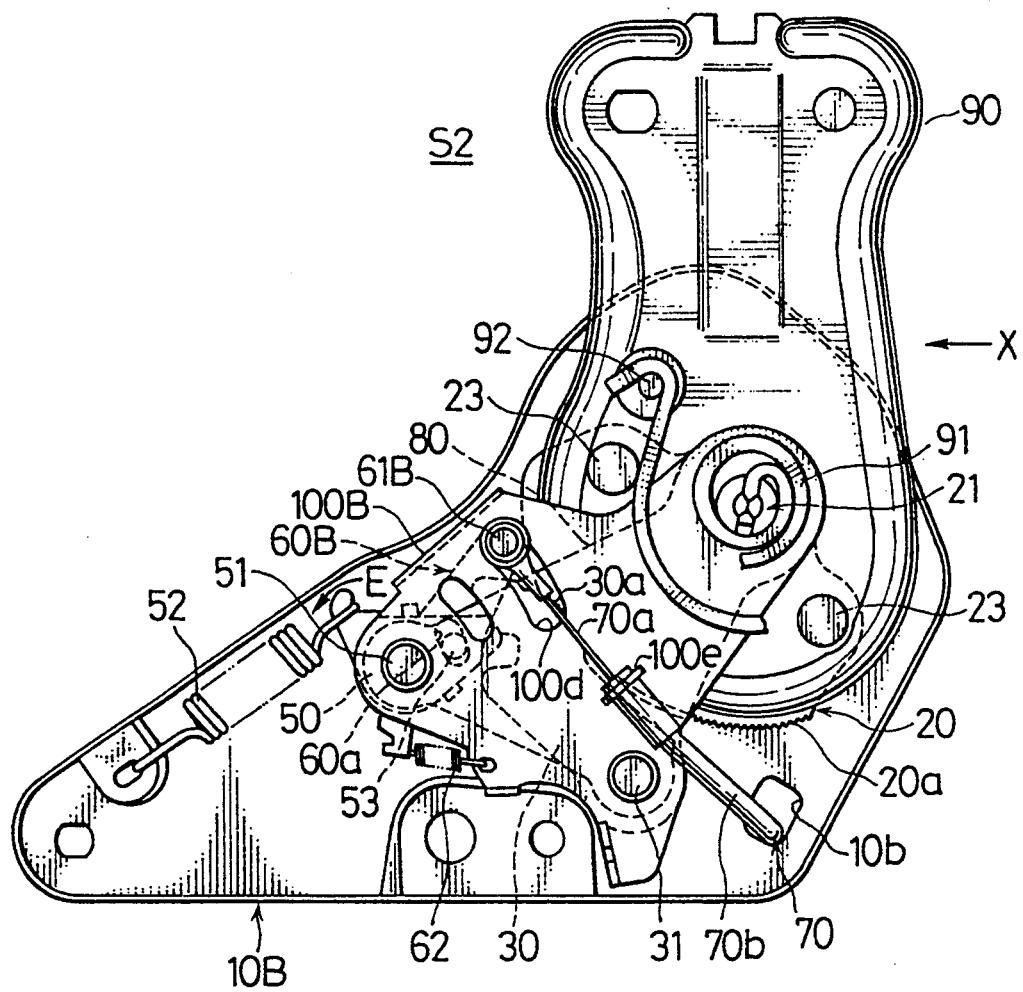
FIG. 9 is a front elevational view for explanation of the seat reclining unit on the inner side in the first embodiment.
Figure 10:
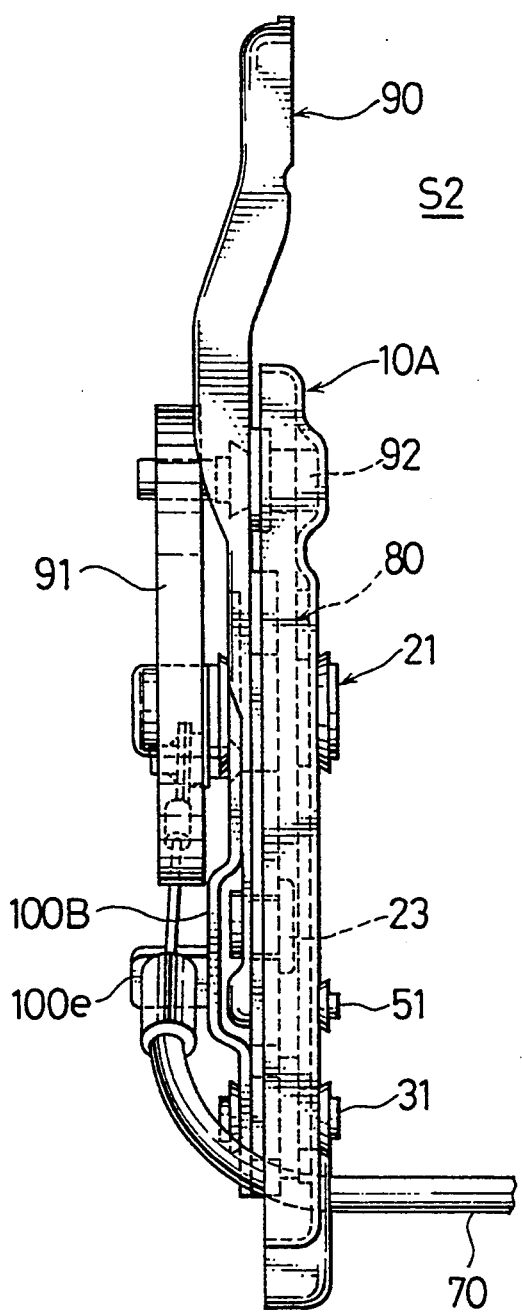
FIG. 10 is a side elevational view for explanation as viewed from an arrow X in FIG. 9.

The seat reclining unit S2 on the inner side will next be described with reference to FIGS. 9, 10 and 12. In this connection, In these figures, the same or identical reference numerals are applied to components and parts the same or identical with those on the outer side, and the description thereof will be omitted.

In connection with the above, gaps b between a pair of through bores 20c and 20d in an upper tooth 20 on the inner side and a pair of mounting pins 23 are assumed to be 0.

A connecting pin 61B mounted on the side of one free end of an actuating lever 60B on the inner side which is mounted on a third pivot 51 is inserted into an arcuate slot 100d which is formed about a center off the third pivot 51 in a holder plate 100B on the inner side. Further, the actuating lever 60B is biased in a direction indicated by an arrow E in FIG. 9 by a tension spring 52 whose both ends are engaged respectively with the side of the other free end of the actuating lever 60B and the holder plate 100B. By doing so, the connecting pin 61B is always abutted against the end of the slot 100d.

A base plate 10B on the inner side is formed with a guide opening 10b by burring processing, at a location opposed to the guide opening 10a in the base plate 10A on the outer side. A wire 70 is arranged such that an outer case 70b has the other end which is fixedly mounted on a guide section 100e formed on the holder plate 100B, through the guide openings 10a and 10b, and the other end of an inner wire 70a is engaged with the connecting pin 61B.

In connection with the above, the upper teeth 20 and 20, the lower teeth 30 and 30 and the cam members 50 and 50 on the outer side and on the inner side cooperate with each other to form the locking mechanisms, respectively.

Operation of the embodiment according to the invention will next be described.

Figure 11:
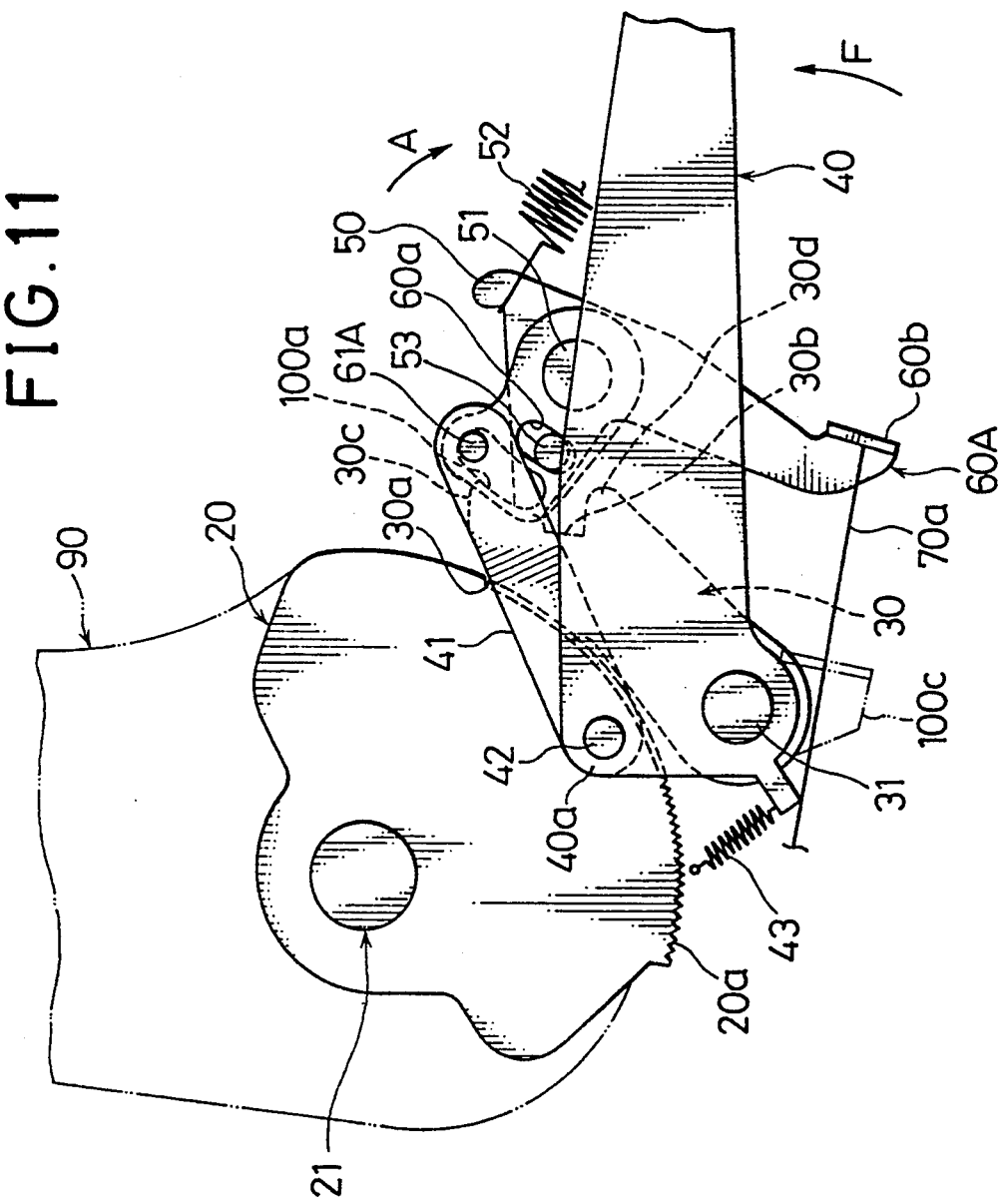
FIG. 11 is a view for explanation of operation of the seat reclining unit on the outer side in the first embodiment.
Figure 12:
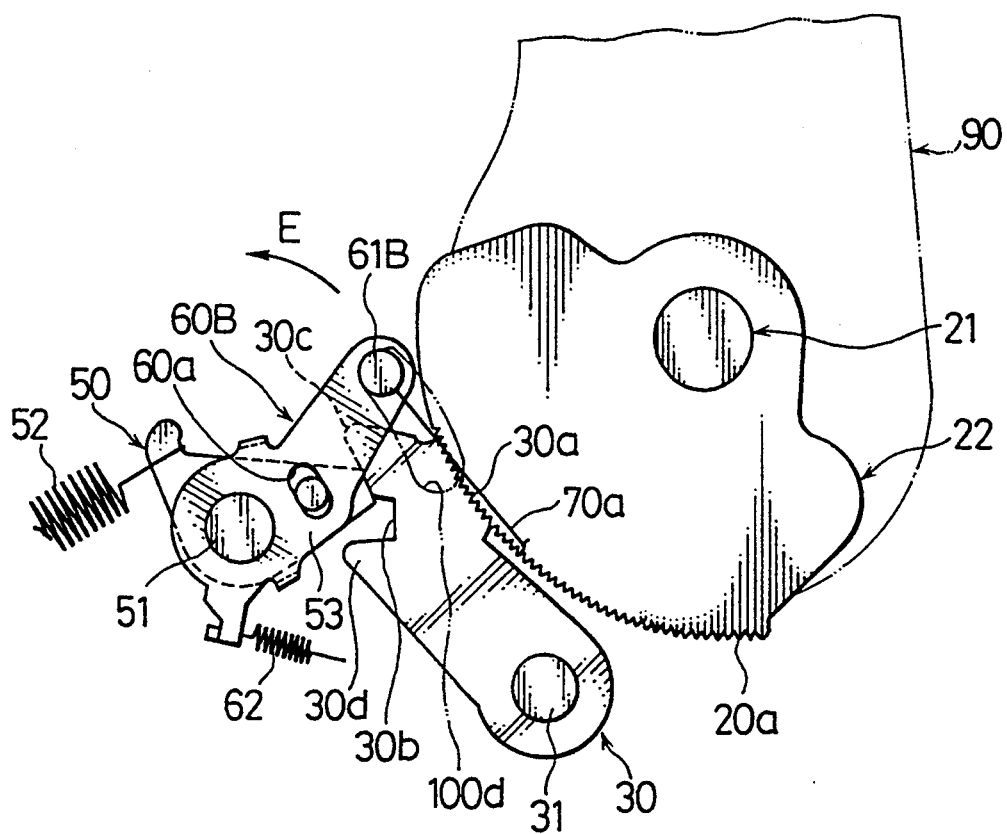
FIG. 12 is a view for explanation of operation of the seat reclining unit the inner side in the first embodiment.

FIGS. 11 and 12 show a condition under which the locking mechanisms for the respective seat reclining units S1 and S2 on the outer side and on the inner side are locked. The cam member 50 is in pressure contact with the projection 30c on the lower tooth 30 by a biasing force of a tension spring 52. By doing so, the teeth 30a on the lower tooth 30 are in mesh with the teeth 20a on the upper tooth 20. Further, the connecting pins 61A and 61B of the respective actuating levers 60A and 60B are in pressure contact respectively with one ends of the slots 100a and 100d in the holder plates 100A and 100B under biasing forces of the respective tension springs 43 and 62.

In order to release locking to tilt the seat back from this locking condition, the operating lever 40 is angularly moved about the second pivot 31 in a direction indicated by an arrow F in FIG. 11. Then, the cain member 50 is moved angularly in an counterclockwise direction about the third pivot 51 in FIG. 11 against the biasing force of the tension spring 52 so as to reach a location opposed to a recess 30b in the lower tooth 30. Furthermore, when the cam member 50 is moved angularly in the same direction and is abutted against a projection 30d, the lower tooth 30 is moved angularly in the clockwise direction about the second pivot 31 in FIG. 11. By doing so, meshing between the teeth 20a on the upper tooth 20 and time tooth 30a on the lower tooth 30 is released so that the arm 90 is moved angularly about the first pivot 21 in the clockwise direction in FIG. 11 by a biasing force of the spiral spring 91.

At this time, since the actuating lever 60A interlocking with the operating lever 40 through the connecting link 41 is moved angularly in the counterclockwise direction about the third pivot 51 in FIG. 11, the inner wire 70a connected to the actuating lever 60A is pulled so that the actuating lever 60B on the inner side is moved angularly in the clockwise direction in FIG. 12. By doing so, similarly to the outer side, the cam member 50 is moved angularly in the clockwise direction against a biasing force of a tension spring 62. Meshing between the teeth 20a on the upper tooth 20 and the teeth 30a on time lower tooth 30 is released. Thus, locking release or unlocking is executed.

In this manner, unlocking of the seat reclining units S1 and S2 on the outer side and on the inner side is executed by operation of the operating lever 40 and, subsequently, the seat back is thrown down to a location desired by an occupant, and the operating lever 40 is released. Then, the operating lever 40 is returned to a position illustrated in FIG. 11 by time biasing forces of the tension springs 43 and 52. At this time, the cain member 50 is moved angularly in the clockwise direction in FIG. 11 through the connecting link 41 and the actuating lever 60A, and pushes up the projection 30c on the lower tooth 30 so that the lower tooth 30 is moved angularly in the counterclockwise direction. Accordingly, the teeth 20a and 30a are in mesh with each other. By doing so, locking of the seat reclining unit S1 on the outer side is executed.

On the other hand, the actuating lever 60B of the seat reclining unit S2 on the inner side is moved angularly in the counterclockwise-direction by the biasing forces of the tension springs 52 and 62 in FIG. 12, because the actuating lever 60A on the outer side is moved angularly in the clockwise direction FIG. 11 and releases the inner wire 70a. Similarly to the outer side, the cam member 50 is moved angularly in the counterclockwise direction. Thus, locking is made to the seat reclining unit S2 on the inner side.

Here, there is a case where shift in phase occurs on the outer side and on the inner side at locking due to distortion of the seat frame, distortion of the floor of the vehicle body, and the like, so that any one of the seat reclining units S1 and S2 is brought to a half locked condition. In this case, in this embodiment, the gaps or clearances b are see respectively between the through bores 20c and 20d in the upper tooth 20 on the outer side and the two (2) mounting pins 23. Since the upper tooth 20 is moved angularly substantially by ½ teeth with respect to the arm 10, the half locked condition is dissolved. Thus, it is possible to bring any one of the seat reclining units S1 and S2 to a perfect or complete locked condition.

Further, in the above-described embodiment, the gaps b are defined respectively between the through bores 20c and 20d in the upper tooth 20 on the outer side and the two (2) mounting pins 23. However, similar gap b may be defined only on the inner side. In case where the gaps b are defined both on the outer side and on the inner side, it is possible to apply the above-described arrangement to the invention if the upper tooth 20 are moved angularly only through ¼ teeth with respect to the arms 10, respectively.

Furthermore, for the seat reclining unit S1 on the outer side, if the operating lever 40 is moved angularly in the counterclockwise direction in FIG. 11, the connecting link 41 is moved to the left-hand direction and, in keeping therewith, the actuating lever 60A is moved angularly in the counterclockwise direction. A right-hand end of a slot 60a in the actuating lever 60A is abutted against the connecting pin 53 of the cam member 50, whereby the cam member 50 Is moved angularly in the counterclockwise direction so that unlocking is executed.

On the other hand, in the seat reclining unit S2 on the inner side, the actuating lever 60B is moved angularly in the clockwise direction as shown in FIG. 12 in interlocking relation to the operating lever 40. The left-hand end of the slot 60a in the actuating lever 60B is abutted against the connecting pin 53 of the cam member 50. Thus, unlocking is executed similarly to the seat reclining unit S1 on the outer side. That is, at the time the slots 60a in the actuating levers 60A and 60B of the respective seat reclining units S1 and S2 are abutted respectively against the connecting pin 53 of the cam members 50, the cam members 50 are moved angularly so that an unlocking action starts.

Accordingly, it is possible to correct, at unlocking, shift in phase of the engaging position of the cam members 50 with respect respectively to the projections 30c on the lower teeth 30 on the outer side and on the inner side due to variation in the mounting portions of the respective second and third pivots 31 and 51 and variation in dimension of various parts such as the lower teeth 30, the upper tooth 20 and the like, by respective cooperating actions between the slots 60a in the respective actuating levers 60A and 60B and the connecting pins S3 on the respective cam members 50. Thus, it is possible to execute unlocking on the outer side and unlocking on the inner side in synchronizing relation to each other.

Further, the wire 70 For connecting the seat reclining units S1 and S2 on the outer side and on the inner side to each other is arranged substantially linearly through the guide bores 10a and 10b formed respectively in the rear portions of the base plates 10A and 10B. Accordingly, it is possible to shortens the wire 70 as far as possible. By doing so, it is possible to improve tension or tensile efficiency of the wire 70 to make operability of the operating lever 40 superior.

Furthermore, since shaft mounting portions of the respective upper teeth 20, lower teeth 30 and cam members 50 are reinforced in their strength respectively by the reinforcing plates 80, it is possible to reduce the thickness of each of the base plates 10A and 10B as far as possible. By doing so, an attempt can be made to reduce the weight of the entire apparatus. Moreover, since the thickness of each of the shaft mounting portions increases and the surface pressure of the shaft mounting portions with respect to the respective pivots 21, 31 and 51 increases, it is possible to secure sufficient mounting strength if the pivots 21, 31 and 51 are mounted by the caulking step. As a result, the conventional welding step can be dispensed with, and an attempt can be made to automatize the assembling line. Thus, it is possible to reduce the manufacturing cost.

In connection with the above, the above-mentioned embodiment has been arranged such that the pivots 21, 31 and 51 are caulked on each of the base plates 10A and 10B. However, the arrangement may be such that the pivots 21, 31 and 51 are caulked directly on each of the reinforcing plates 80, and the base plates 10A and 10B are merely mounted respectively on the reinforcing plates 80.

In connection with the above, in the above-described first embodiment, the arrangement is such that the flange 90b is formed on the arm 96, the flange 90b is inserted into the through bore 20b formed in the upper tooth 20, with the predetermined gap a, the damper 22 formed of the rubber-like elastic material is interposed at the gap a, and the upper tooth 20 can be retained at the neutral position by the damper 22. However, a damper as illustrated in a subsequent second embodiment (FIGS. 13 to 23) may be used as the damper 22.

Figure 13:
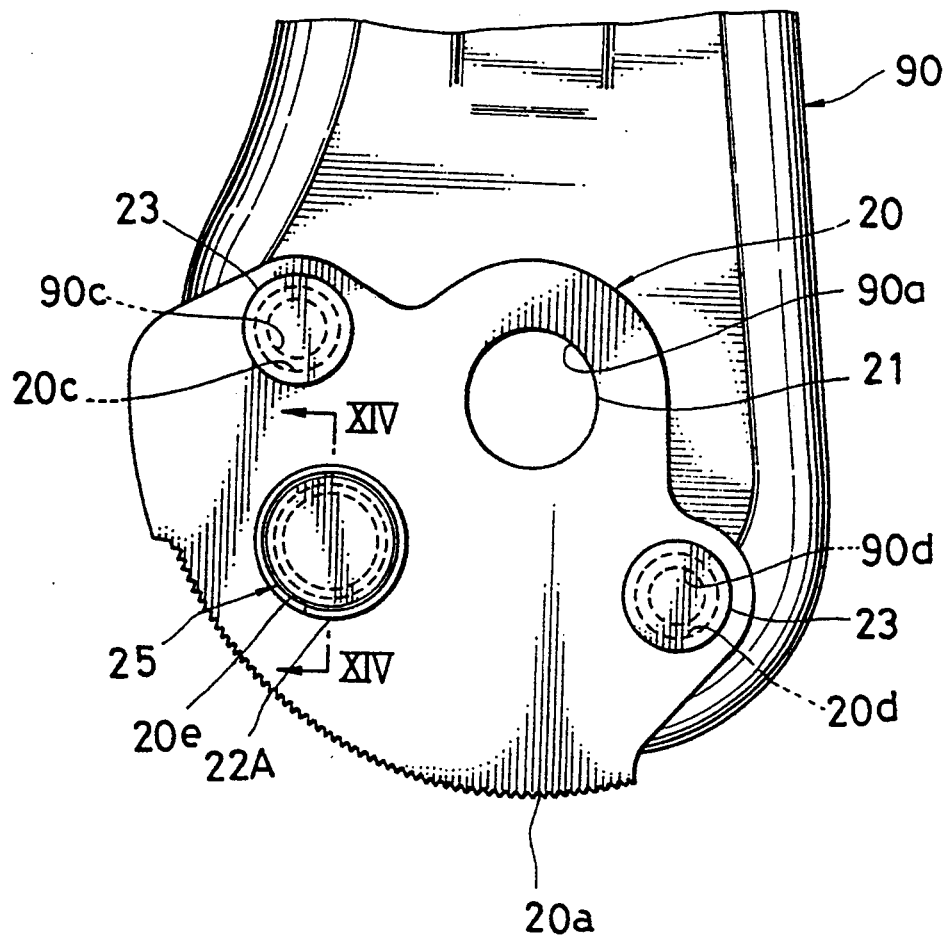
FIG. 13 is a view for explanation of a second embodiment of this invention, showing a relationship between an arm provided with a damper and an upper tooth.
Figure 14:
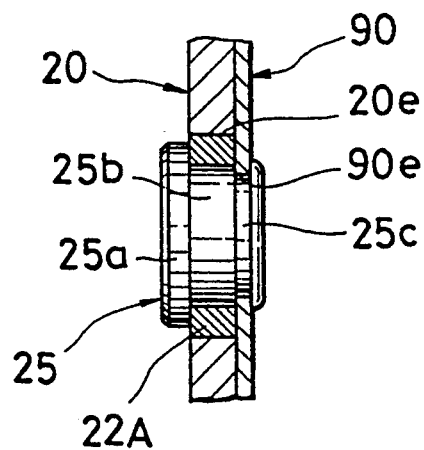
FIG. 14 is a cross-sectional view for explanation taken along a line XIV—XIV in FIG. 13.
Figure 15:
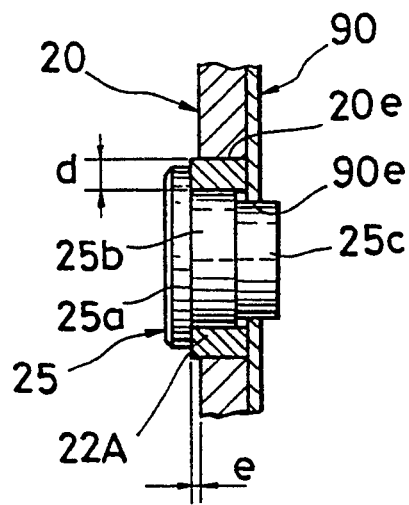
FIG. 15 is a cross-sectional view, equivalent to FIG. 14, showing a condition prior to caulking of damper mounting pins.

FIGS. 13 to 15 show a second embodiment according to the invention. Specifically, FIG. 13 is a view for explanation showing a relationship between an arm provided with a damper and an upper tooth; FIG. 14 is a cross-sectional view for explanation taken along a line XIV—XIV in FIG. 13; and FIG. 15 is a cross-sectional view for explanation, equivalent to FIG. 14, showing a condition before a damper mounting pin is caulked.

In this second embodiment, a damper mounting pin 25 is used which has a flange 25a, a larger-diameter section 25b and a smaller-diameter section 25c, in place of the flange 90b on the arm 90 illustrated in the first embodiment. The smaller-diameter section 25c is inserted into a through bore 90e formed in the arm 90, while the larger-diameter section 25b is inserted into a through bore 20e formed in the upper tooth 20 in concentric relation to the through bore 90e, with a predetermined gap d. A damper 22A formed of a rubber-like elastic material high in hardness is interposed at the gap d. The damper 22A has an outer peripheral surface and an inner peripheral surface which are so set as to be inserted respectively into-the through bore 20e in time upper tooth 20 and about time larger-diameter section 25b of the damper mounting pin 25. Further, time damper 22A has a height which is so set as to be larger than the thickness of the upper tooth 20 by e, while the larger-diameter section 25b of the damper mounting pin 25 has a length which is so set as to be the same as or identical with the thickness of the upper tooth 20.

When the smaller-diameter section 25c of the damper mounting pin 25 is caulked as shown in FIG. 14 from a condition prior to caulking of the damper mounting pin 25 as shown in FIG. 15, the damper 22A is compressed by the flange 25a of the damper mounting pin 25. By doing so, a resilient or elastic force is applied to the damper 22A so that it is possible to retain the upper tooth 20 at a neutral position without play or backlash.

In this manner, according to the above-described second embodiment, when the damper 22A is inserted into the through bore 20e in the upper tooth 20 and into the larger-diameter section 25b in the-damper mounting pin 25, since any no compressive force acts on the damper 22A, it is possible to easily insert the damper 22A into the through bore 20e and the large-diameter section 25b. Accordingly, it is possible to considerably improve mounting workability or operability of the damper 22A.

Figure 16:
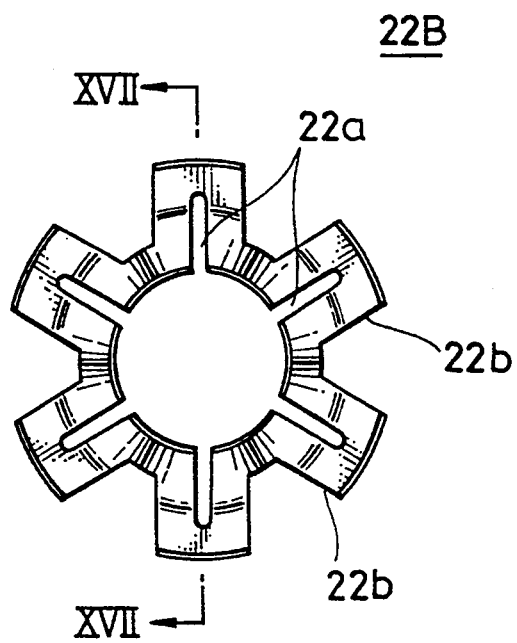
FIG. 16 is a top plan view for explanation of a damper pins; in a third embodiment according to the invention.
Figure 17:
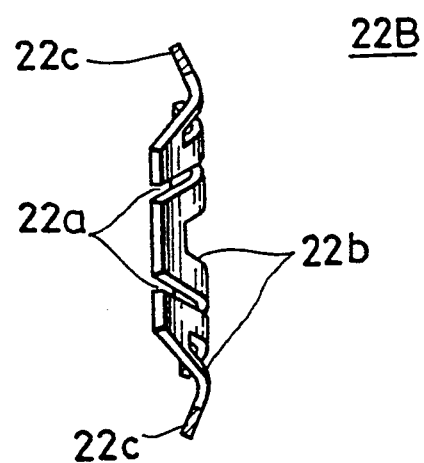
FIG. 17 is a cross-sectional view for explanation taken along a line XVII—XVII in FIG. 16.
Figure 18:
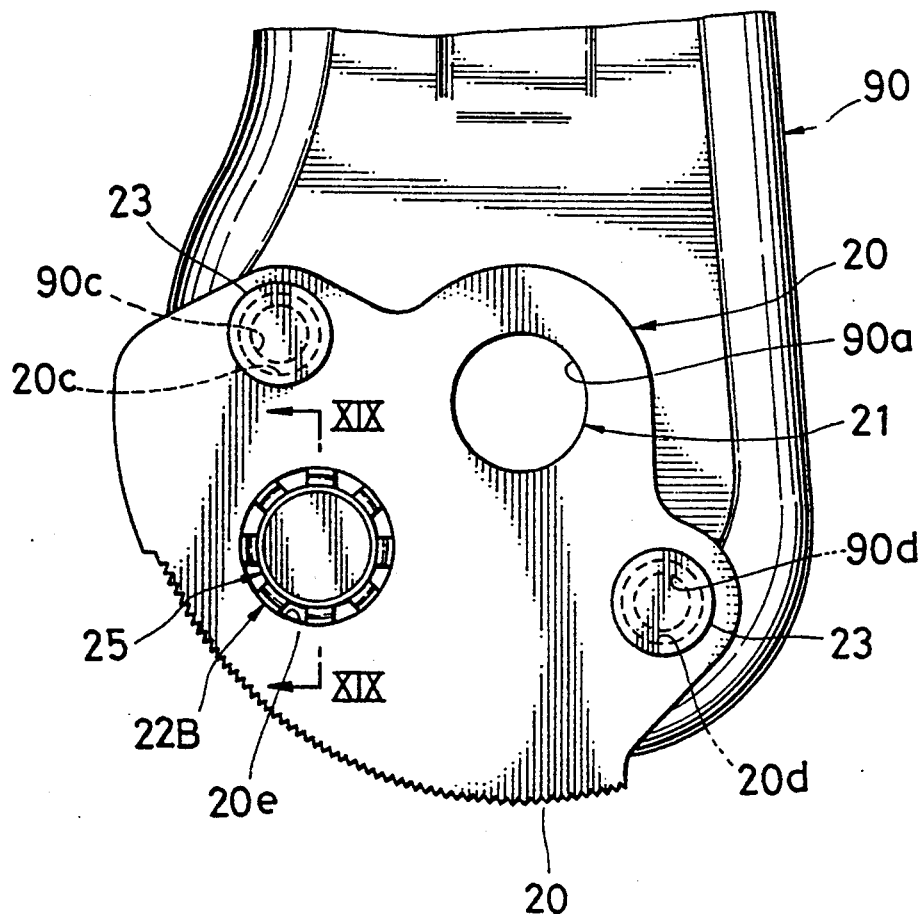
FIG. 18 is a view for explanation showing a relationship between an upper tooth and an arm provided with a damper in a third embodiment according to the invention.
Figure 19:
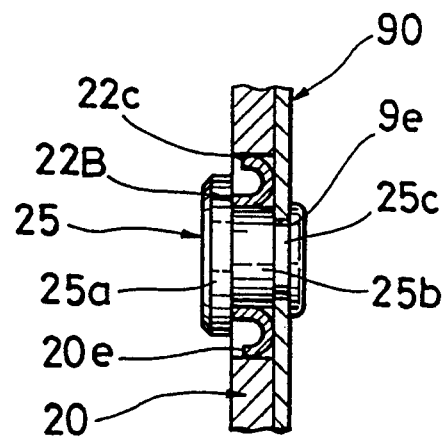
FIG. 19 is a cross-sectional view for explanation taken along a line XIX—XIX ill FIG. 18.
Figure 20:
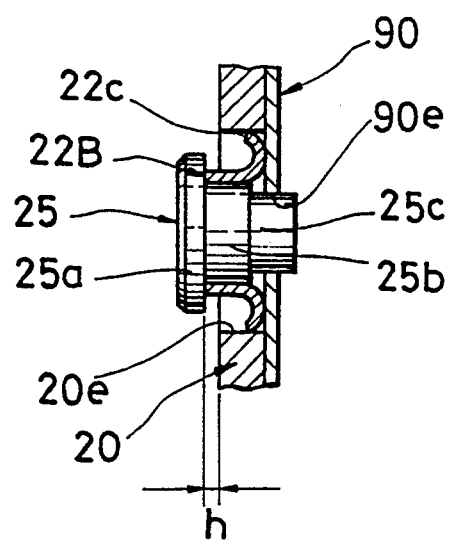
FIG. 20 is a cross-sectional view, equivalent to FIG. 19, showing a condition prior to caulking of damper mounting pins.

FIGS. 16 through 20 show a third embodiment of the invention. Specifically, FIG. 16 is a top plan view for explanation of a damper; FIG. 17 is a cross-sectional view for explanation taken along a line XVII—XVII in FIG. 16; FIG. 18 is a view for explanation showing a relationship between an arm provided with the damper and an upper tooth; FIG. 19 is a cross-sectional view for explanation taken along a line XIX—XIX in FIG. 18; and FIG. 20 is a cross-sectional view for explanation, equivalent to FIG. 19, showing a condition prior to caulking of a damper mounting pin.

In this third embodiment, in place of the damper 22A formed of the rubber-like elastic material shown in the second embodiment, a damper 22B formed of a leaf spring is used. The damper 22B is formed into a cylindrical configuration, and has an upper portion which is formed in its outer peripheral surface with a plurality of, for example, six (6) slits 22a at equal intervals or at same spacing such that upper portions of the respective slits 22a open, while the damper 22B has a lower portion which is formed at its outer peripheral surface with six (6) cut-outs 22b facing respectively intermediate portions of the slits 22a such that lower portions of the respective cut-outs 22b open. Further, a lower portion of the damper 22b including the cut-outs 22b has an outer peripheral surface which is formed with arcuate bent portions 22c which are curved outwardly.

Setting is made such that the damper 22B has an inner peripheral surfaced which is inserted into the larger diameter section 25b of the damper mounting pin 25, while the bent portion 22c of the damper 22B is inserted into the through bore 20e in the upper tooth 20. Furthermore, the damper 22B has a height which is so set as to be larger than the thickness of the upper tooth 20 only by h.

When the smaller-diameter section 25c of the damper mounting pin 25 is caulked as shown in FIG. 19 from a condition prior to caulking of the damper mounting pin 25 as shown in FIG. 20, the damper 22B is compressed by the flange 25a of the damper mounting pin 25. Advantages of the third embodiment are similar to those of the aforesaid second embodiment, and the description thereof will be omitted.

Figure 21:
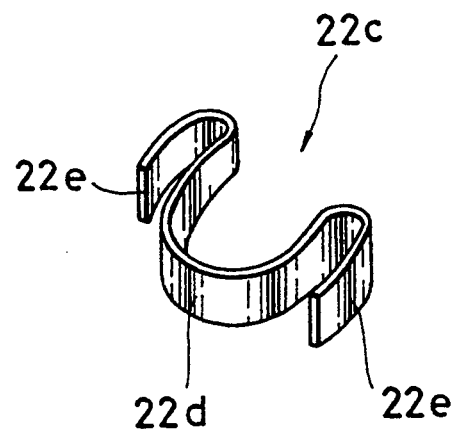
FIG. 21 is a perspective view for explanation of a damper in a fourth embodiment according to the invention.
Figure 22:
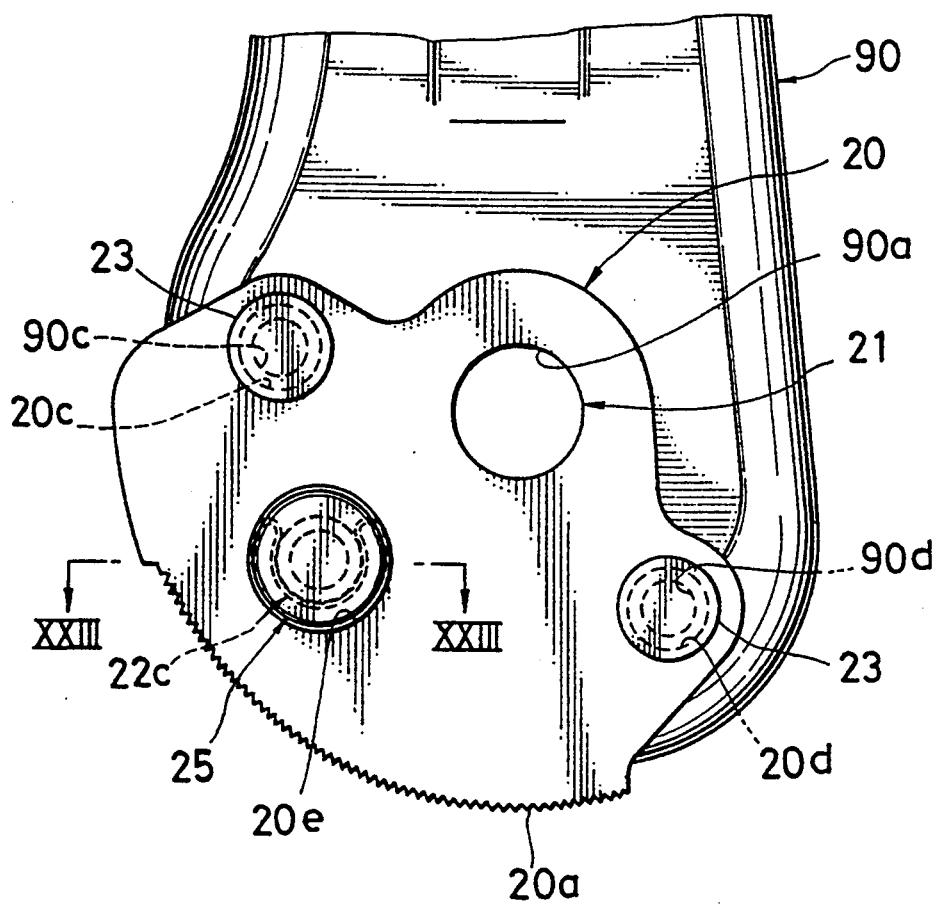
FIG. 22 is a view for explanation showing a relationship between an upper tooth and an arm provided with a damper in the fourth embodiment.
Figure 23:
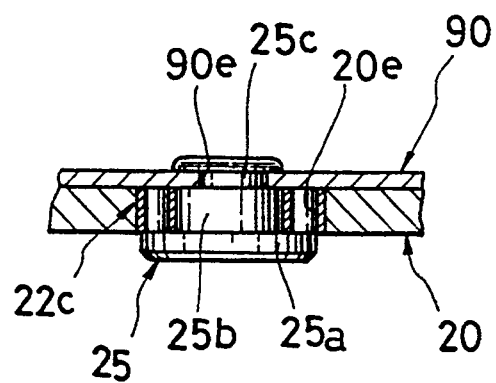
FIG. 23 is a cross-sectional view for explanation taken along a line XXIII—XXIII in FIG. 22.

FIGS. 21 through 23 show a fourth embodiment of the invention. Specifically, FIG. 21 is a perspective view for explanation of a damper; FIG. 22 is a view for explanation showing a relationship between an arm provided with the damper and an upper tooth; and FIG. 23 is a cross-sectional view for explanation taken along a line XXIII—XXIII in FIG. 22.

In this fourth embodiment, a damper 22C formed of a leaf spring is used similarly to the arrangement illustrated in the third embodiment. The damper 22C has a proximal portion 22d formed into a U-shaped configuration, and a pair of curved portions 22e formed respectively into inverted U-shaped configurations from both ends of the proximal portion 22d. The proximal portion 22d is inserted into the larger-diameter portion 25b in the damper mounting pin 25, while the curved portion 22e are elastically urged against the through bore 20e in the upper tooth 20. Further, the damper 22C has a height which is so set as to be the same as the thickness of the upper tooth 20 or to be slightly smaller than the thickness of the upper tooth 20.

As shown in FIG. 23, the smaller-diameter portion 25c of the damper mounting pin 25 is caulked whereby it is possible to retain the upper tooth 20 to the neutral position by the elastic force of the damper 22C without play or backlash.

In this manner, according to the above-described fourth embodiment, only the fact that the curved portion 22e of the damper 22C in which the proximal portion 22d is fitted in and inserted into the larger-diameter portion 25b of the damper mounting pin 25 are so inserted as to be urged against the through bore 20e in the upper tooth 20, it is possible to mount the damper 22C on the upper tooth 20. Accordingly, it is possible to considerably improve mounting operability of the damper 22C.

A fifth embodiment of the invention will next be described.

In FIGS. 24 to 29, the reference character E denotes a seat reclining unit on which a locking mechanism on the outer side is mounted. The seat reclining unit E is arranged such that an upper tooth 110, a lower tooth 120 engageable with and disengageable from the upper tooth 110, and an actuating member 130 for actuating the lower tooth 120 are mounted on a reinforcing plate 140, and the reinforcing plate 140 is mounted on a base plate 150.

The embodiment is particularly characterized in that the reinforcing plate 140 extends at 140a, and the extension 140a is united together to a slide-unit mounting portion 150a of the base plate 150.

Structure or construction of this embodiment will next be described in further detail.

The base plate 150 is fixedly mounted on a side of a seat cushion on the outer side, and the reinforcing plate 140 is arranged are a rear portion of the base plate 150 in an overlapping manner thereto. The upper tooth 110 is mounted on a first pivot 111 which is mounted on the reinforcing plate 140, and has a lower edge portion which is formed with arcuate teeth 110a. Moreover, an arm 112 fixedly mounted on a side of a seat back (not shown) on the outer side is unitedly provided on the upper tooth 110 in an overlapping manner thereto.

The lower tooth 120 is mounted on a second pivot 121 which is mounted on the reinforcing plate 140, and has an upper edge portion which is formed with teeth 120a in mesh with the teeth 110a on the upper tooth 110. A pair of projections 120c and 120d are formed respectively on both sides of a lower edge portion opposite to the teeth 120a, with the recess 120b positioned between the pair of projections 120c and 120d. The actuating member 130 is mounted on a third pivot 131 which is mounted on the reinforcing plate 140. The actuating member 130 has one free end portion which is formed with an engaging portion 130a which is engaged with the pair of projections 120c and 120d of the lower tooth 120. Further, a tension spring 132 is mounted between the other free end portion of the actuating member 180 and the base plate 150. By the tension spring 182, the actuating member 180 is so biased as to be moved angularly in the counterclockwise direction.

An upper tooth 110, a lower tooth 120 and the actuating member 130 cooperate with each other to form a locking mechanism R.

An actuating lever 133 is unitedly mounted fixedly on the actuating member 180, and a connecting link 134 has one end thereof which is connected to and pivoted to an upper free end portion of the actuating member 130 by a pin 135. Further, a wire 160 for connecting the locking mechanism R on the outer side and a locking mechanism on the inner side to each other is latched to or engaged with a lower free end portion of the actuating lever 133. The wire 160 is connected to the locking mechanism on the inner side through a guide opening 150b in the base plate 150 via a guide section 170a formed on a holder plate 170 to be described subsequently.

The first, second and third pivots 111, 121 and 131 have respective one ends thereof on which the holder plate 170 is fixedly mounted so as to clamp the upper tooth 110, the lower tooth 120; the actuating member 130 and the actuating lever 133. A spiral spring 113 is wound about the first pivot 111 which projects from the holder plate 170. The spiral spring 113 has one end thereof which is engaged with the first pivot 111, while the other end of the spiral spring 113 is engaged with an engaging pin 114 which is mounted on the arm 112. By the spiral spring 113, the arm 112 is so biased to be moved angularly in the counterclockwise direction. Furthermore, the first, second and third pivots 111, 121 and 131 have respective other ends thereof which are inserted respectively in bores formed in the base plate 150 and, subsequently, projecting portions are caulked whereby the first, second and third pivots 121 and 131 are fixedly mounted on the base plate 150.

The reinforcing plate 140 is so arranged as to extend at an extension 140a toward a lower flange 150a of the base plate 150 which serves as a slide-unit mounting section. A flange 140b formed at a lower end of the extension 140a is fixedly mounted unitedly on the lower-end flange 150a of the base plate 150. Moreover, the reinforcing plate 140 is provided with a bead 140c to improve rigidity of the reinforcing plate 140. Further, a weld nut 141 for fixedly mounting an upper rail (not shown) of the slide unit is mounted on the flange 140b.

An operating lever 180 for operating the actuating member 130 through the actuating lever 133 is mounted on the second pivot 121 which projects from the holder plate 170. The other end of the connecting link 134 is connected to and pivoted to an upper extension of the operating lever 180 by a pin 136. Furthermore, the operating lever 180 is so biased as to be moved angularly in the counterclockwise direction by a tension spring 132. Angular movement of the operating lever 180 is restricted by the fact that a side extension 180a is abutted against a stopper 170b which is so formed as to be cut and raised on the holder plate 170. By doing so, the operating lever 180 at locking of the locking mechanism R is so set as to be retained always at a predetermined position.

Operation of the fifth embodiment will next be described.

Figure 24:
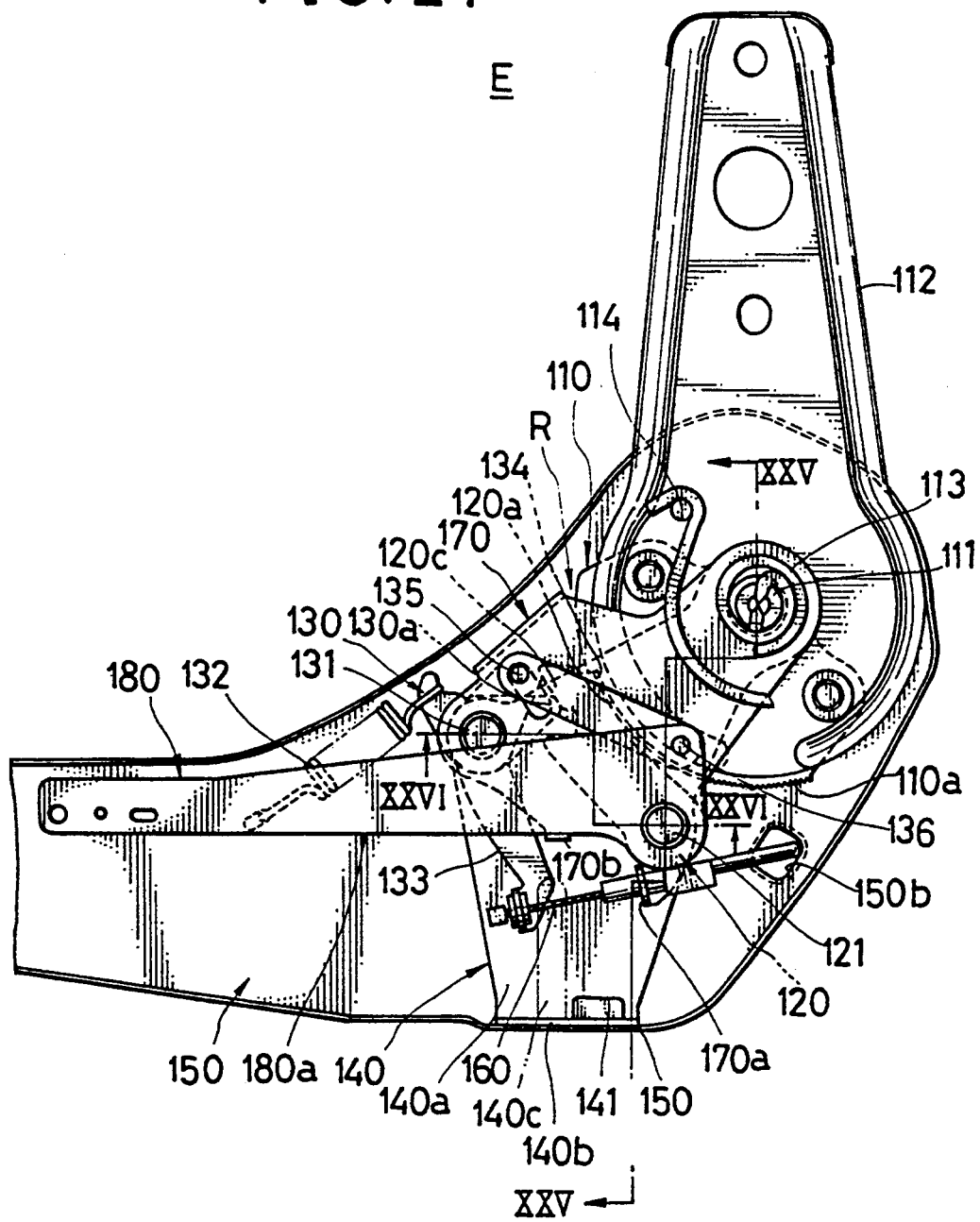
FIG. 24 is a front elevational view showing a seat reclining apparatus according to a fifth embodiment of the invention.
Figure 25:
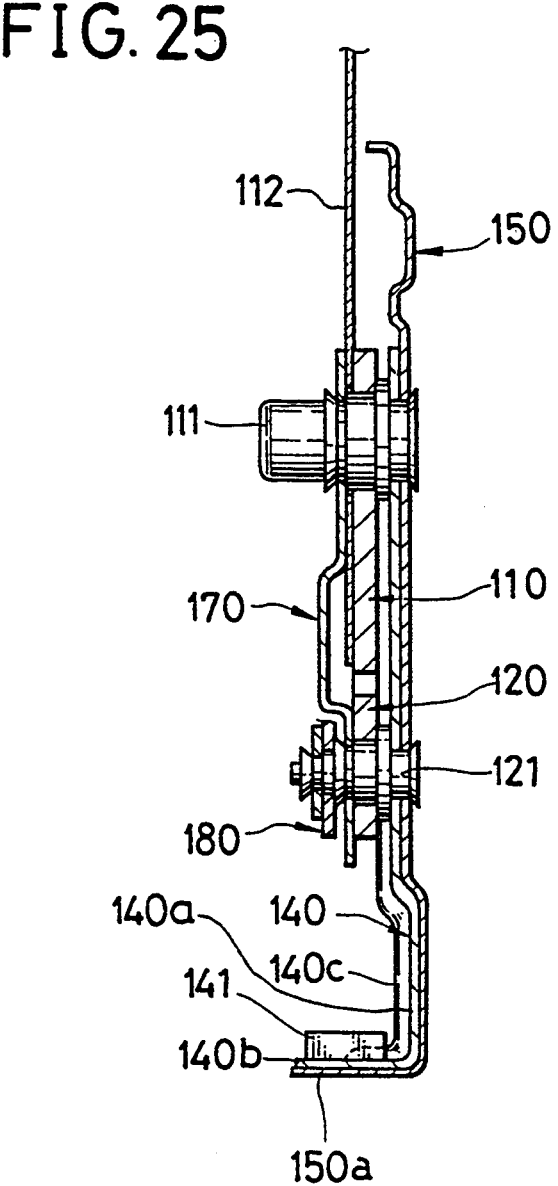
FIG. 25 is a cross-sectional view taken along a line XXV—XXV in FIG. 24, showing a relationship between a reinforcing plate and a base plate in the fifth embodiment.
Figure 26:
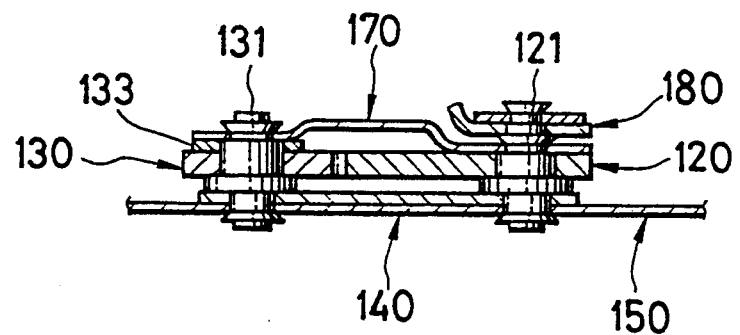
FIG. 26 is a cross-sectional view taken along a line XXVI—XXVI in FIG. 24, showing a relationship between the reinforcing plate and the base plate in the fifth embodiment.
Figure 27:
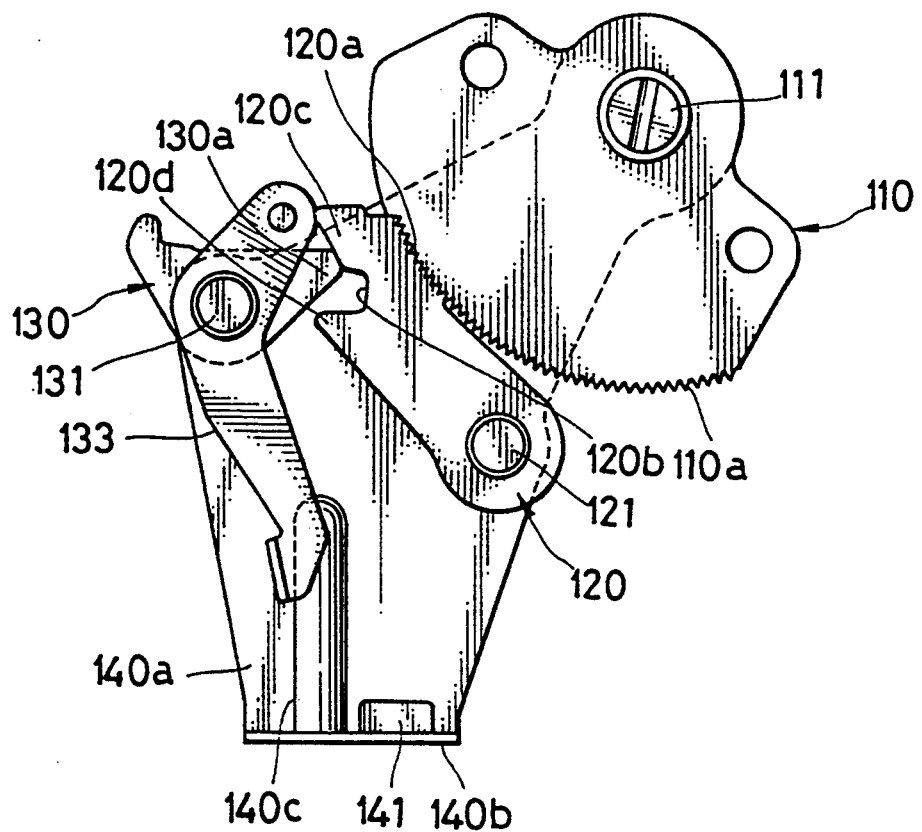
FIG. 27 is a view for explanation showing a condition under which an upper tooth, a lower tooth and an actuating member are mounted on the reinforcing plate in the fifth embodiment.
Figure 28:
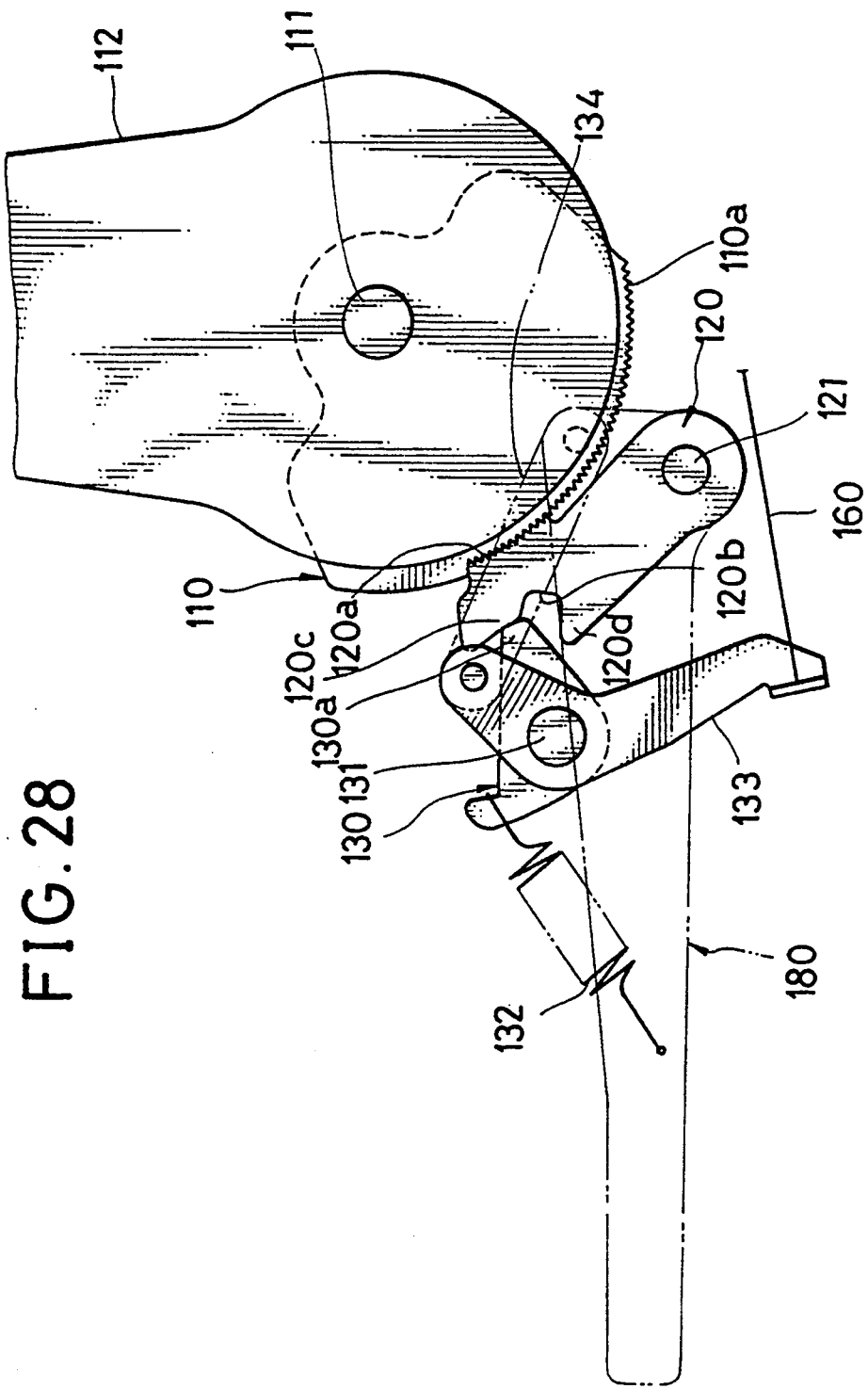
FIG. 28 is a view for explanation showing a condition of a locking mechanism at locking in the fifth embodiment.
Figure 29:
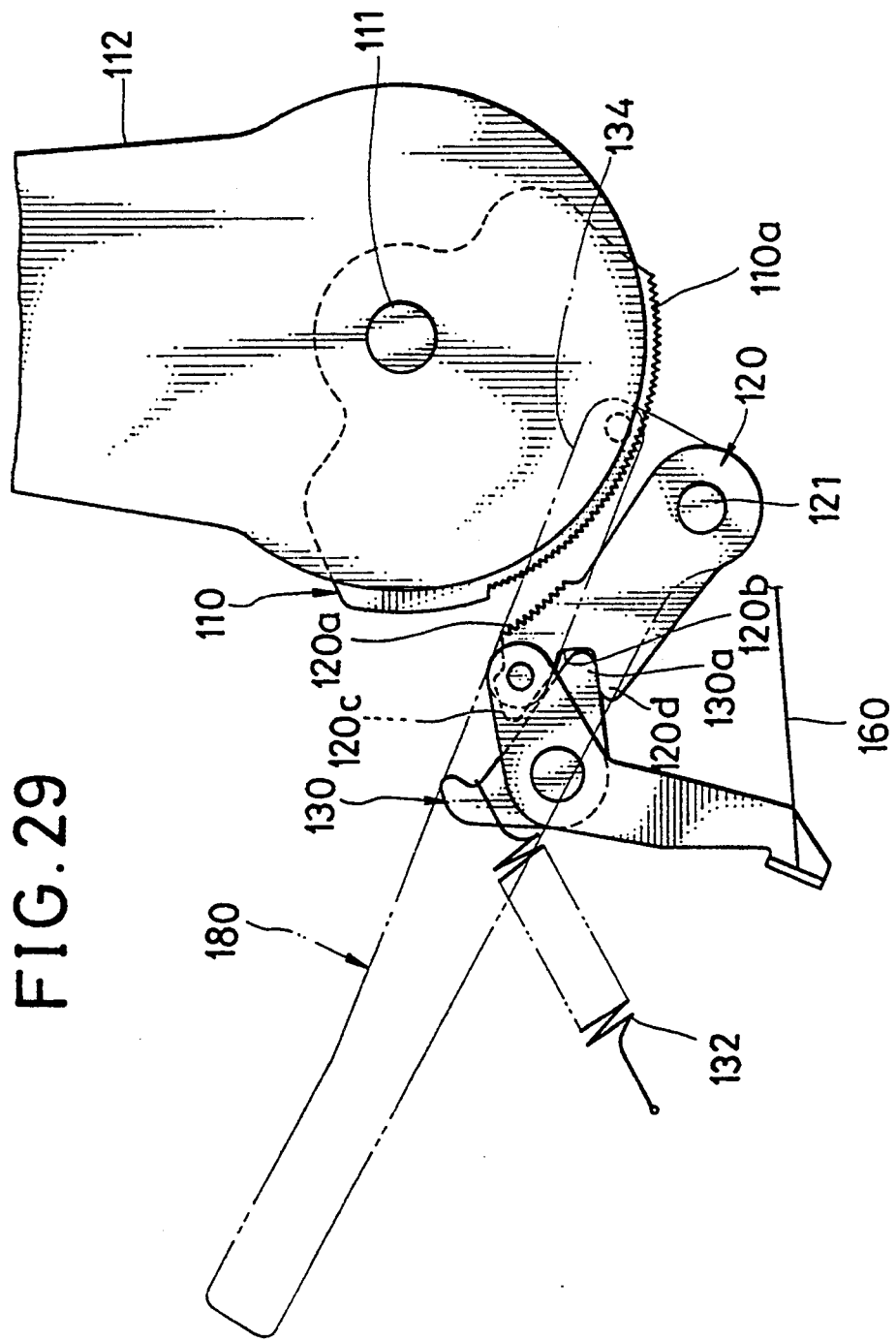
FIG. 29 is a view for explanation showing a condition of the locking mechanism at unlocking in the fifth embodiment.

FIGS. 24 and 29 show a condition under which the locking mechanism R on the outer side is locked. The engaging portion 130a of the actuating member 130 is in pressure contact with the projection 120c of the lower tooth 120 by the biasing force of the tension spring 132. By doing so, the teeth 120a of the lower tooth 120 are in mesh with the teeth 110a of the upper tooth 110.

In order to unlock the locking mechanism R to tilt the seat back from this locking condition, the operating lever 180 is moved angularly in the clockwise direction against the biasing force of the tension spring 132. Then, the actuating member 130 is moved angularly in the clockwise direction through the connecting link 134 and the actuating lever 133. When the engaging section 130a of the actuating member 130 is engaged with the projection 120d of the lower tooth 120, the lower tooth 120 is moved angularly in the counterclockwise direction. By doing so, meshing between the teeth 110a of the upper tooth 110 and the teeth 120a of the lower tooth 120 with each other is released so that the locking mechanism R is brought to an unlocking condition as shown in FIG. 18.

At this time, since the actuating lever 133 interlocking with the operating lever 180 through the connecting link 134 is moved angularly in the clockwise direction, the wire 160 engaged with the actuating lever 133 is pulled, whereby the actuating member of the locking mechanism (not shown) on the inner side Is operated so that the locking mechanism is brought to a release condition.

In this manner, the locking mechanisms on the outer side and the inner side arc unlocked by operation of the operating lever 180 and, subsequently, the seat back is thrown down to a position desired by an occupant or crew, and the operating lever 180 is left. Then, both the locking mechanisms are again locked so that it is possible to fix the seat back. The detailed description thereof will be omitted.

Here, a considerably large lead is applied to the first pivot 111 that is the mounting portion of the upper tooth 110, from the seat back through the arm 112 and, in keeping therewith, a considerably large lead is applied also to each of the second and third pivots 121 and 131 that are the mounting portions of the lower tooth 120 and the actuating member 130. Since, however, the rigidity of each of the mounting portions is reinforced by the reinforcing plate 140, it is possible to reduce the thickness of the base plate 150 correspondingly.

Further, since the flange 140*b* on the extension 140*a* of the reinforcing plate 140 is fixedly mounted unitedly on the lower-end flange 150*a* that Is the slide-unit mounting portion of the base plate 150, the reinforcing plate 140 can considerably improve the longitudinal rigidity of the base plate 150 as well as the lateral rigidity thereof. As a result, it is possible to considerably reduce the thickness of the base plate 150, and an attempt can be made to lighten or reduce the weight off the seat reclining apparatus.

In connection with the above, in the aforesaid embodiment, the seat reclining apparatus has been described in which the locking mechanisms are provided respectively on the outer side and on the inner side of the seat. It is of course, however, that the invention is applicable also to a seat reclining apparatus in which a locking mechanism is provided only on either one of the outer side and the inner side.

INDUSTRIAL APPLICABILITY

As described above, according to the invention, since it is possible to displace the upper tooth with respect to the arm, it is possible to correct the shift in phase at locking of the seat reclining units, and it is possible to eliminate the half locking. As a result, even if the upper tooth and the lower tooth are reduced in their strengths, there is no case where the upper tooth and the lower tooth are broken. Accordingly, it is possible to reduce the thickness of each of the upper tooth and the lower tooth. Thus, an attempt can be made to reduce the cost, and an attempt can be made to reduce the weight.

Further, according to the invention, it is possible to correct shift in phase at unlocking of each of the reclining mechanisms, and it is possible to synchronize unlocking of one of the reclining mechanisms and unlocking of the other reclining mechanism with each other. By doing so, it is possible to improve operation feeling of the operating lever.

Furthermore, according to the invention, it is possible to shorten or reduce the length of the wire which connects the seat reclining units on the Outer side and on the inner side to each other. By doing so, it is possible to improve the tension efficiency of the wire and to make the operability of the operating lever superior, and an attempt can be made to reduce the cost.

Moreover, according to the invention, since the strength of each of the mounting portions of the respective upper tooth, lower tooth and actuating member by the reinforcing plate, it is possible to reduce the thickness of the base plate as far as possible, and an attempt can be made to lighten or reduce the weight of the entire apparatus. Further, since the pivots of the respective mounting portions can be mounted by the caulking step so that the welding step can be dispensed with, an attempt can be made to automatize the assembling line, and it is possible to considerably reduce the manufacturing cost.

Further, according to the invention, since the extension of the reinforcing plate is united to the slide-unit mounting portion of the base plate, it is possible to considerably improve the rigidity of the base plate, particularly, the lateral rigidity thereof. By doing so, it is possible to considerably reduce the thickness of the base plate, and an attempt can be made to reduce the weight of the seat reclining apparatus.

We claim:

1. A seat reclining apparatus for adjusting the inclined angle of a seat, comprising:
   a seat cushion having a right hand side and a left hand side;
   a seat back having a right hand side and a left hand side;
   a pair of base plates mounted one each on the right and left hand sides of said seat cushion;
   a pair of arms mounted one each on the right and left hand sides of said seat back, wherein said arms are supported by said base plates so as to be angularly movable relative thereto;
   a pair of upper teeth supported one each by each of said arms, and where at least one of said pair of upper teeth supported by one of said arms is angularly movable through only a predetermined angle with respect to said arm;
   a pair of lower teeth supported one each by each of said base plates so as to be angularly movable relative thereto, whereby said lower teeth can be engaged with and disengaged from said upper teeth, respectively;
   a pair of cam members supported one each by each of said base plates so as to be angularly movable relative thereto, and for engaging said lower teeth with and disengaging said lower teeth from said upper teeth, respectively; and
   an operating lever for operating said pair of cam members.

2. The seat reclining apparatus of claim 1, further comprising a pair of angular movement permitting structures for permitting angular movement of said upper teeth through a predetermined angle with respect to said arms and which are capable of retaining the position into which said upper teeth have been moved with respect to said arms, and wherein said pair of upper teeth is supported by said arms so as to be angularly movable relative thereto.

3. The seat reclining apparatus of claim 2, wherein each of said angular movement permitting structures further comprise a pair of flanges formed on each of said arms, a pair of dampers fitted one each into each of said flanges, and a pair of through bores formed in each of said upper teeth and fitted into each of said dampers.

4. The seat reclining apparatus of claim 2, wherein each of said angular movement permitting structures further comprise a pair of through bores formed in each of said arms, a pair of through bores formed in each of said upper teeth, a pair of mounting pins inserted into said through bores for connecting said upper teeth to said angular movement permitting structures, and a pair of dampers interposed between the outer peripheries of said mounting pins and the surfaces of said through bores in said upper teeth.

5. The seat reclining apparatus of claim 4, wherein each of said dampers is formed of a rubber-like elastic material.

6. The seat reclining apparatus of claim 4, wherein each of said dampers is formed as a leaf spring.

7. The seat reclining apparatus of claim 1, further comprising:
- a connecting member for simultaneously operating each of said cam members; and
- a synchronizing mechanism for synchronizing the operation of each of said cam members.

8. The seat reclining apparatus of claim 7, wherein said synchronizing mechanism further comprises of pair of actuating members supported one each by each of said base plates, a common axis on which said synchronizing mechanism and each of said cam members are disposed wherein said synchronizing mechanism may be angularly moved relative to said base plates along said axis, and wherein one each of said actuating members is connected to one each of said cam members so as to be angularly movable through a predetermined angle with respect to said cam members, and where said actuating members are operated by said operating lever.

9. The seat reclining apparatus of claim 8, wherein said actuating members further comprise a plurality of slots formed therein, and a plurality of connecting pins connected to each of said cam members and fitted within each of said slots on said actuating members.

10. The seat reclining apparatus of claim 1, wherein each of said base plates has a guide bore, and a connecting member extending through said guide bores.

11. The seat reclining apparatus of claim 10, wherein said connecting member further comprises a wire.

12. The seat reclining apparatus of claim 1, further comprising a right and left hand side reinforcing member for reinforcing each of said base plates, said lower teeth, and said cam members.

13. The seat reclining apparatus of claim 12, wherein each of said base plates has a slide unit mounting portion, and wherein said reinforcing member further reinforces the slide unit mounting portion of said base plate.

* * * * *